United States Patent [19]

Yago et al.

[11] Patent Number: 5,555,067
[45] Date of Patent: Sep. 10, 1996

[54] PHOTOGRAPHIC FILM SEPARATING DEVICE AND SEPARATION METHOD

[75] Inventors: Atsushi Yago; Katsuhiko Tanaka; Makoto Saotome, all of Kanagawa, Japan

[73] Assignee: Fuji Photo Film Co., Ltd., Kanagawa, Japan

[21] Appl. No.: 265,155

[22] Filed: Jun. 24, 1994

[30] Foreign Application Priority Data

Jun. 25, 1993 [JP] Japan .................................. 5-155606

[51] Int. Cl.⁶ .................................................. G03D 13/10
[52] U.S. Cl. ........................ 354/354; 354/341; 242/584.1
[58] Field of Search ............................... 354/86, 88, 303, 354/341, 354; 242/584.1, 348, 608, 608.4, 341, 332.5; 226/90–92

[56] References Cited

U.S. PATENT DOCUMENTS

| | | | |
|---|---|---|---|
| 3,481,552 | 12/1969 | Gersch et al. | 242/584.1 |
| 3,586,258 | 6/1971 | Horlezeder | 242/524 |
| 3,811,637 | 5/1974 | Edwards | 242/341 X |
| 4,765,561 | 8/1988 | Kaps | 242/332.5 |
| 4,834,306 | 5/1989 | Robertson et al. | 242/71.1 |
| 4,846,418 | 7/1989 | Fairman | 242/71.1 |
| 5,049,912 | 9/1991 | Pagano et al. | 354/275 |
| 5,054,710 | 10/1991 | Ikariya et al. | 242/584.1 |
| 5,285,980 | 2/1994 | Combet et al. | 226/92 X |
| 5,325,144 | 6/1994 | Yoshikawa et al. | 354/319 |
| 5,347,338 | 9/1994 | Weibel | 354/340 |
| 5,351,904 | 10/1994 | Mitake | 242/584.1 |
| 5,360,183 | 11/1994 | Takahashi et al. | 242/587.3 |
| 5,473,402 | 12/1995 | Long et al. | 354/321 X |

FOREIGN PATENT DOCUMENTS

| | | | |
|---|---|---|---|
| 1-61749 | 3/1989 | Japan . | |
| 4122925 | 4/1992 | Japan | G03C 3/00 |
| 4177251 | 6/1992 | Japan | G03D 13/00 |

Primary Examiner—D. Rutledge
Attorney, Agent, or Firm—Sughrue, Mion, Zinn, Macpeak & Seas

[57] ABSTRACT

A photographic film separation method. A spool has a slit, a first rod-shaped member and a second rod-shaped member. The second rod-shaped member has a lower rigidity than that of the first rod-shaped member so that the second rod-shaped member is flexibly deformable. The first rod-shaped member has an engagement member which engages one longitudinal direction end portion of a photographic film. The second rod-shaped member has a presser pawl which maintains engagement between the photographic film and the engagement member. The separating member has a higher rigidity than that of the second rod-shaped member, and has a tip end portion which penetrates substantially simultaneously to positions at which the engagement member and the presser pawl are provided. The separating member is inserted between the engagement member and the photographic film positioned inside the slit, and releases the engagement between the photographic film and the engagement member. The second rod-shaped member as a whole has a low rigidity. Accordingly, when the separating member is inserted into the slit, the second rod-shaped member is lifted upward together with the presser pawl by the separating member, so that the photographic film engaged by the engagement member can easily be pulled out by a small force and without any damage, such as rubbing or the like, to the film.

21 Claims, 19 Drawing Sheets

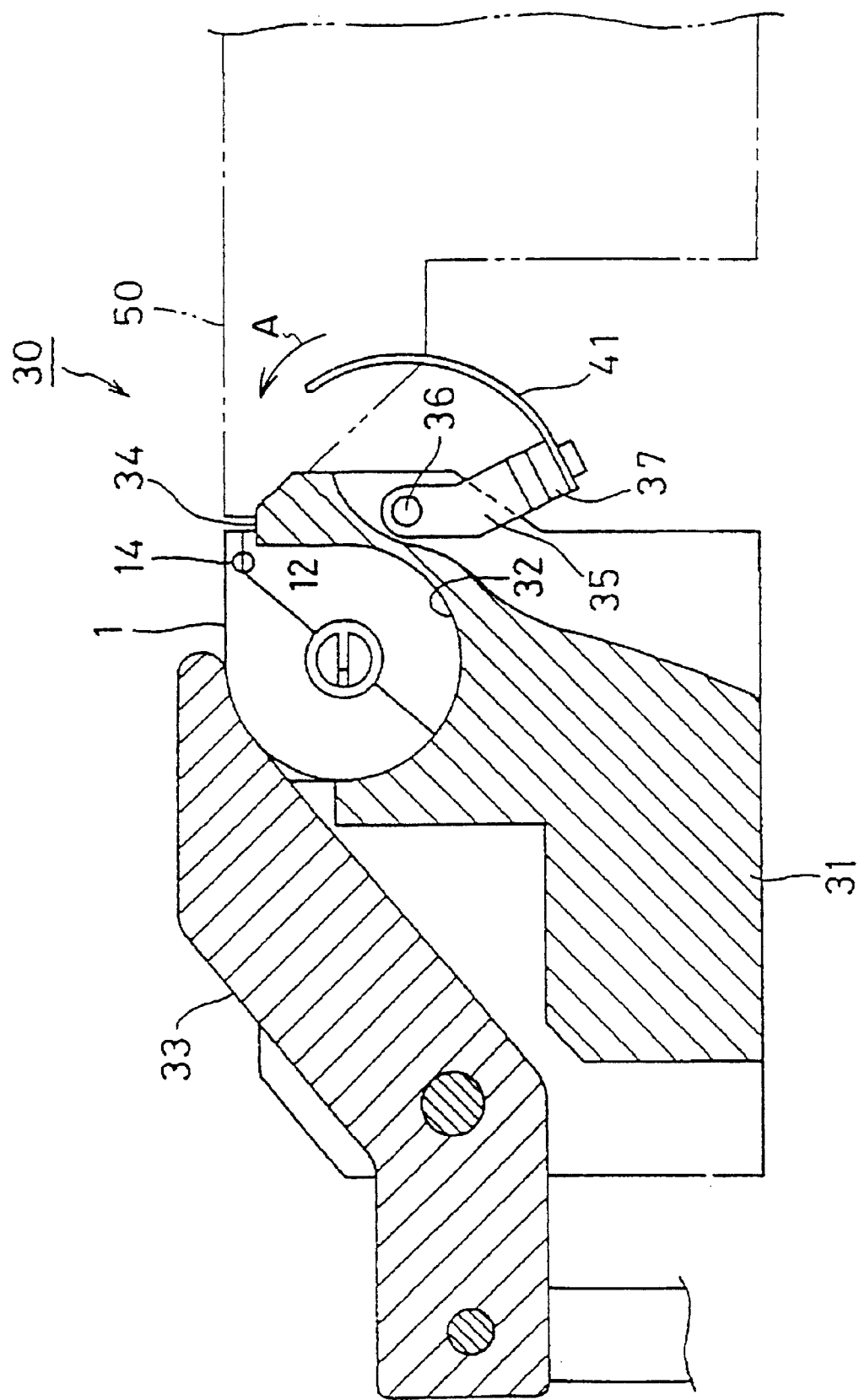

5,555,067

PHOTOGRAPHIC FILM SEPARATING DEVICE AND SEPARATION METHOD

BACKGROUND OF THE INVENTION

1. Field of the Invention

The present invention relates to a method which makes it possible to pull a photographic film out of a cartridge which accommodates said photographic film such that said film is shielded from light, and more specifically, a method for separating a photographic film from a spool which engages the photographic film.

2. Description of the Related Art

In the case of 135 type photographic film cartridges, which are the most widely used type of film cartridge, the main body of the cartridge is constructed from two caps and a cartridge cylinder formed by forming a thin metal plate into the shape of a cylinder. The cartridge is constructed such that a spool around which the photographic film is wound is accommodated inside the cartridge main body. Methods for assembling such a photographic film cartridge include a method in which assembly is performed in a dark room so that a spool, around which a photographic film has been wound, is enveloped by a cartridge main body, and a method in which a cartridge main body which has already been temporarily assembled is disassembled into respective portions in a photographic film loading area inside a dark room, and a spool around which the photographic film is wound is inserted into the cartridge main body, after which the cartridge main body is re-assembled.

Alternatively, a method may be used in which a cartridge main body containing a spool around which no film is wound is constructed in a light room, after which a tongue-shaped guide plate is inserted into a film passage formed in the cartridge main body. A photographic film is inserted into the cartridge main body from the trailing end portion of the film by using the guide plate, and the trailing end portion of said photographic film is engaged with the spool. Thereafter, the photographic film is taken up into the cartridge main body by rotating the spool.

In accordance with the specification of U.S. Pat. Nos. 4,834,306 and the specification of 4,846,418, photographic film cartridges in which the cartridge main body is assembled from a molded resin, and which function so as to feed photographic film to the outside of the cartridge by the rotation of a spool, are disclosed. Such photographic film cartridges differ from their predecessors in that no photographic film leader portion protrudes from the cartridge main body regardless of whether the photographic film is unused or has been used. As a result, the following advantages are obtained: not only is the photographic film accommodated so that it is shielded from light, but handling of the film following use thereof is also simplified.

However, in the case of photographic film cartridges which have a photographic film feed-out function using the rotation of a spool, there is an increase in the number of constituent parts of the cartridge main body due to the fact that, for example, such cartridges are constructed so that the film passage formed in the cartridge main body can be opened or closed by means of a light-blocking cover, or due to the incorporation into the cartridge main body of a display member which indicates whether the film has been used or not or due to the use of a structure such as that disclosed in the specification of U.S. Pat. No. 5,049,912 may be used. Accordingly, it is difficult to increase the production efficiency in the case of methods in which the cartridge main body is disassembled and reassembled in a dark room in order to load the photographic film into the cartridge.

Further, even if such assembly work is automated, there are drawbacks problems in terms of workability when response to the occurrence of trouble is taken into consideration.

Moreover, at the time of development, photographic film which has already been used to take photographs is pulled out of the cartridge. However, since the trailing end portion of the photographic film is engaged with the spool, the film cannot be separated from the cartridge main body merely by pulling the film out. In the past, therefore, it has been the practice to cut the photographic film so that a portion of the film is left in the cartridge main body. However, in cases in which the photographic film remains in the cartridge main body, the cartridge main body cannot be reused "as it is". Further, in cases in which the resin material of the cartridge main body is melted and recycled as a raw material, the quality of the resin material drops if photographic film is mixed with the resin material. Accordingly, it is necessary to temporarily disassemble the cartridge main body and remove the photographic film fragments remaining therein. Thus, after-treatment of the cartridge main body is inconvenient.

As a means of solving the above-mentioned drawbacks and problems, the applicant of the present application has proposed a photographic film cartridge and a method for pulling a photographic film out of the cartridge, as disclosed in Japanese Patent Application Laid-Open No. 4-122925 and Japanese Patent Application Laid-Open No. 4-177251.

Specifically, in the photographic film cartridge disclosed in Japanese Patent Application Laid-Open No. 4-122925, a rod which can move a pawl is inserted into an insertion hole therefor which is exposed at the exterior of the cartridge main body, and the engagement between engagement pawls and engagement holes formed in the photographic film is released, after which the photographic film is pulled out of the cartridge.

However, in the structure disclosed in Japanese Patent Application Laid-Open No. 4-122925, it is necessary to form an insertion hole in the cartridge main body and provide a driving mechanism for the pawl movable rod. Accordingly, not only the structure of the cartridge main body but also the structure used to pull the film out becomes complicated.

Further, in the method for pulling a film out of a cartridge disclosed in Japanese Patent Application Laid-Open No. 4-177251, a rectangular hole is formed in a portion of the cartridge main body. When the photographic film is to be pulled out, a guide member is inserted from the rectangular hole, and the engagement between the photographic film and an engagement member is released. Moreover, the rectangular hole is ordinarily covered by a seal so that the interior of the cartridge main body is shielded from light. When the photographic film is pulled out, the seal is broken by the guide member. Further, the guide member is driven by an air cylinder provided in the cartridge case.

In this structure, a rectangular hole must be formed in the cartridge main body, and this hole must be covered by a seal. Accordingly, the structure of the cartridge main body becomes complicated. In addition, since an air cylinder is provided in the cartridge case, the structure for pulling out the film also becomes more complicated.

Further, there is also a structure in which a circular-arc-shaped separating member is inserted from the passage through which the photographic film is pulled out, and the engagement between the photographic film and engagement pawls is canceled by means of the separating member. In this structure, there is the concern need to form a rectangular hole or an insertion hole in the cartridge main body, and accordingly, the structure is simplified. However, there is the concern that the photographic film will be damaged by the separating member.

SUMMARY OF THE INVENTION

In light of the above-mentioned drawbacks, an object of the present invention is to provide a photographic film separating device and separation method in which a photographic film can be pulled out of a cartridge in a simple manner and without damaging said photographic film.

The first aspect of the present invention is a photographic film separation method comprising the steps of: providing a cartridge which is formed by a cartridge main body provided such that an interior portion thereof can be maintained in a light-shielded state, and a spool which is provided at the interior portion of the cartridge main body such that the spool is freely rotatable around an axis of the spool, the spool having a slit which is formed along an axial direction of the spool, a first rod-shaped member provided, with respect to the slit, in a direction of directions orthogonal to the axial direction of the spool, and a second rod-shaped member provided in a direction orthogonal to the axial direction of the spool at an opposite side of the first rod-shaped member with respect to the slit, the second rod-shaped member having a lower rigidity than the first rod-shaped member and being flexibly deformable, the first rod-shaped member having an engagement member which engages a longitudinal direction end portion of a photographic film at a surface of the first rod-shaped member opposing the slit, the second rod-shaped member having a presser pawl which protrudes from a surface of the second rod-shaped member opposing the slit and which maintains a state of engagement between the photographic film and the engagement member; inserting a separating member between the engagement member and the photographic film positioned within the slit, the separating member having a higher rigidity than the second rod-shaped member and having a tip end portion provided so as to penetrate substantially simultaneously to positions at which the engagement member and the presser pawl are provided; and releasing engagement between the photographic film and the engagement member.

The second aspect of the present invention is a device for separating a photographic film wound on a spool provided within a cartridge main body, the device comprising: a holder for holding the cartridge main body; and separating member having a higher rigidity than a shaft portion of the spool, the separating member being inserted between a photographic film positioned inside a slit formed in the shaft portion of the spool and an engagement member which protrudes into the slit and engages a trailing end portion of the photographic film, so that engagement between the photographic film and the engagement member is released.

In the above-described first and second aspects of the present invention, a slit is formed along the longitudinal direction of the shaft body which forms the spool, and an engagement member is provided at the surface of the first rod-shaped member opposing the slit. The first rod-shaped member is substantially separated from the second rod-shaped member due to the formation of the slit. Accordingly, the trailing end of the photographic film can be separated from the engagement member by inserting the separating member into the slit. Further, a photographic film presser pawl is formed at the second rod-shaped member which is substantially separated from the first rod-shaped member due to the formation of the slit, and the second rod-shaped member as a whole is formed so as to have a low rigidity. Accordingly, when the separating member is inserted into the slit, the second rod-shaped member is lifted upward together with the presser pawl by the separating member, so that the photographic film previously engaged with the engagement member can easily be pulled out by a small force and with no damage, such as rubbing or the like, to the film. The separating member has a tip-like shape which is such that the tip end portion of the separating member penetrates substantially simultaneously to regions inside the slit at which the presser pawl and the engagement member are provided. Accordingly, the separating member can reliably be caused to penetrate between the photographic film and the engagement member. Further, since the separating member has a higher rigidity than that of the second rod-shaped member, the penetration of the separating member into the slit causes the second rod-shaped member to deform so that the presser pawl is lifted upward, thus facilitating the cancellation of the engagement of the photographic film. Moreover, if the separating member has corner portions on the external shape of the tip end which is inserted into the slit, the corner portions may catch on the shaft body when the separating member is inserted into the slit, or the corner portions may contact the film and thus damage the film. However, by forming the external shape of the tip end into a shape which has no corner parts (e.g., a circular-arc shape or the like), there is no catching at the time of insertion into the slit or damaging of the film due to contact with the film. The term "external shape of the tip end" refers to both the external shape of the tip end when the separating member is viewed from above, and the external shape of the tip end in cross section.

BRIEF DESCRIPTION OF THE DRAWINGS

FIG. 5 is a schematic structural view which illustrates a photographic film separating device.

DESCRIPTION OF THE PREFERRED EMBODIMENTS

Below, a first embodiment of the present invention will be described with reference to the attached figures.

Figure 1:
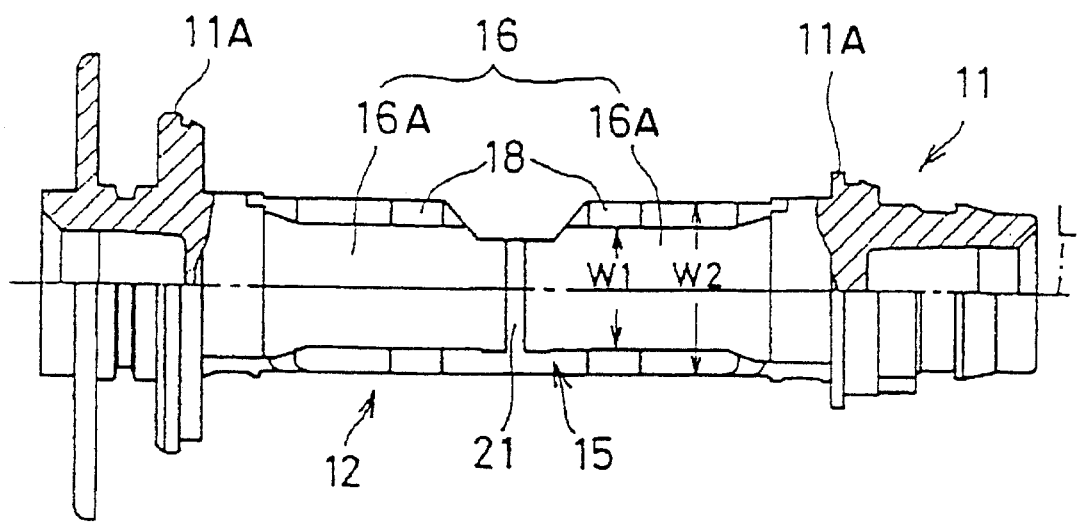
FIG. 1 is a partially sectional plan view of a spool relating to a first embodiment of the present invention.
Figure 2:
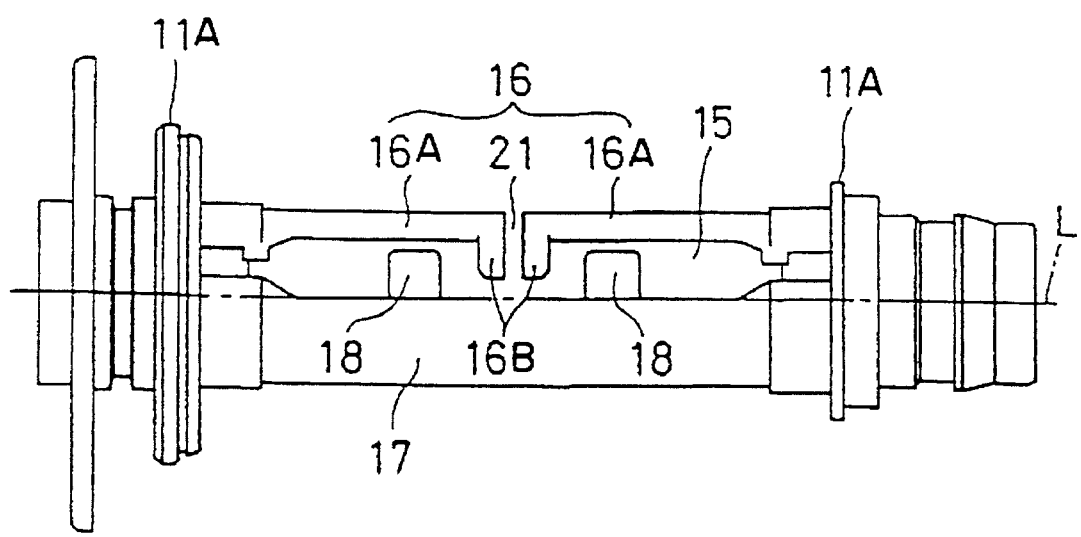
FIG. 2 is a front view of the spool relating to the first embodiment of the present invention.
Figure 3:
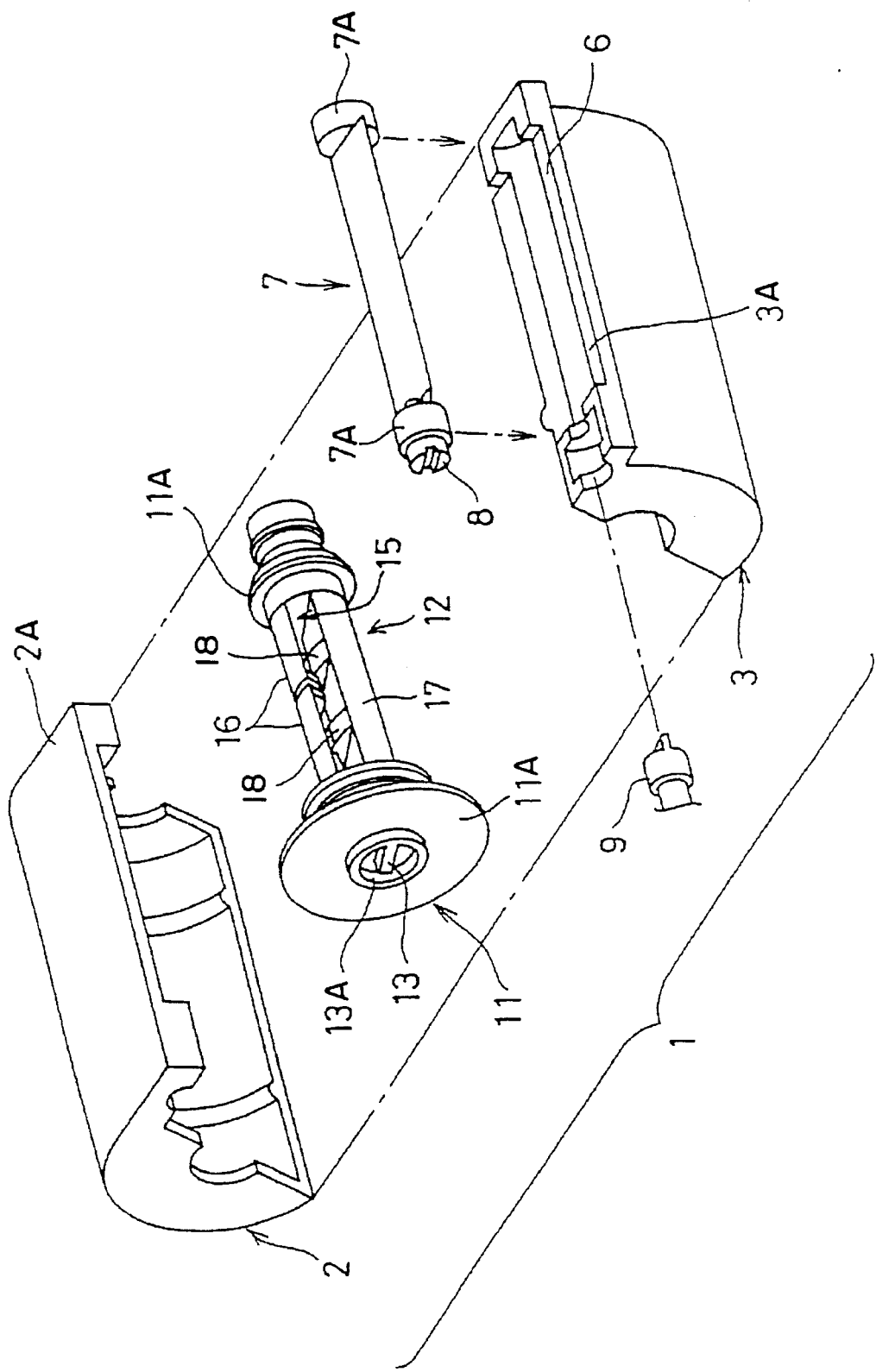
FIG. 3 is an exploded perspective view which illustrates the structure of a cartridge main body.
Figure 4:
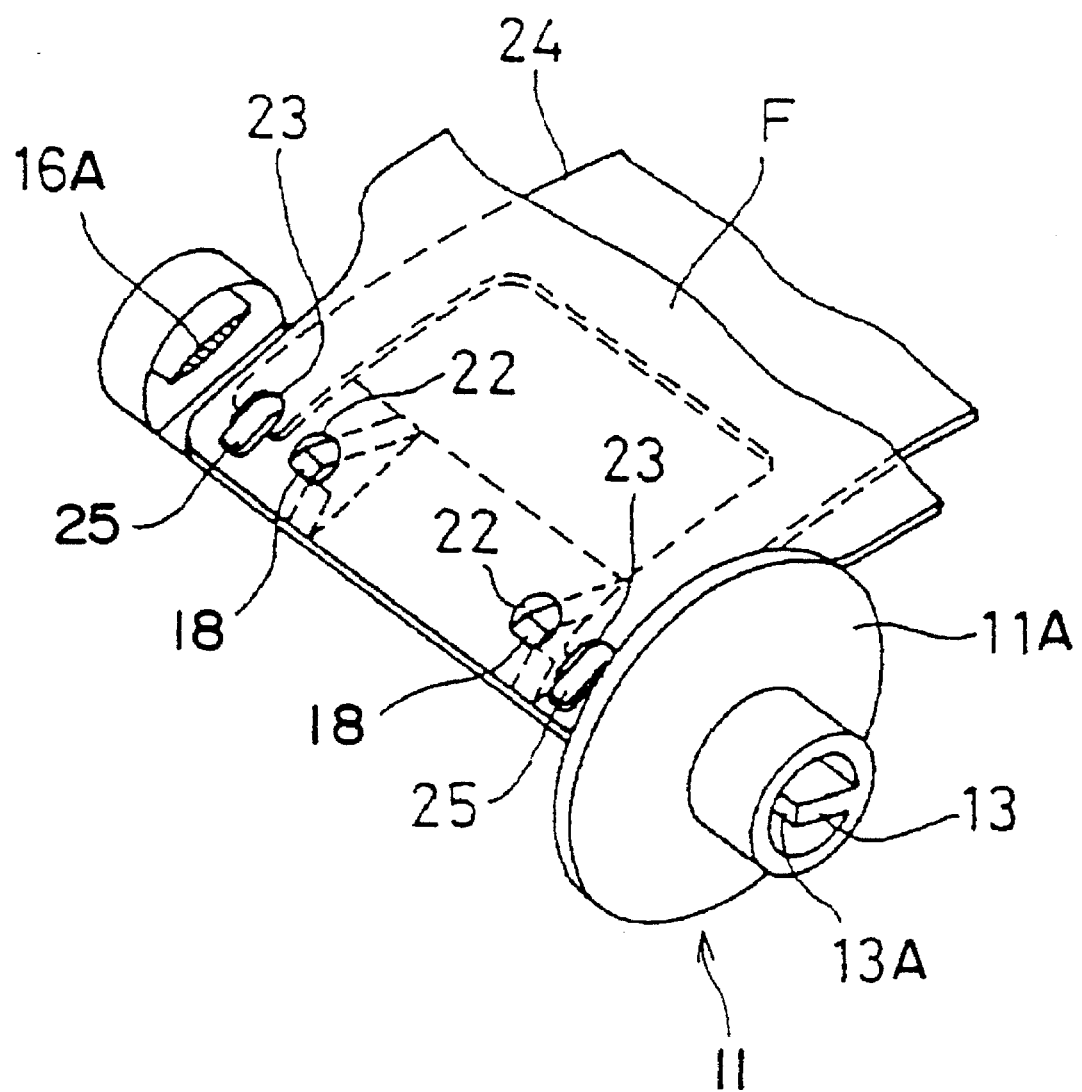
FIG. 4 is a perspective view of main portions of a cartridge, which illustrates an engaged state of a photographic film.
Figure 7A:
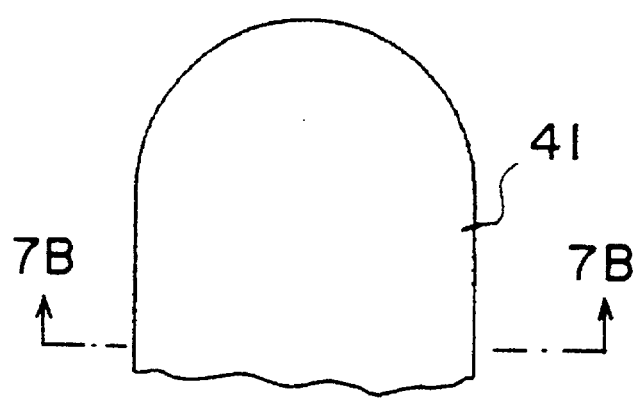
FIG. 7A is a front view which illustrates another embodiment of the separating member.
Figure 7B:
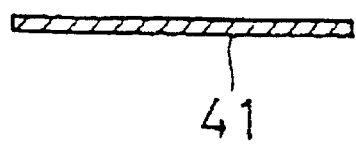
FIG. 7B is a sectional view taken along line 7B—7B of FIG. 7A.
Figure 7C:
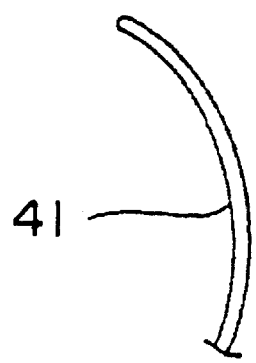
FIG. 7C is a left-side view of the separating member shown in FIG. 7A.
Figure 8:
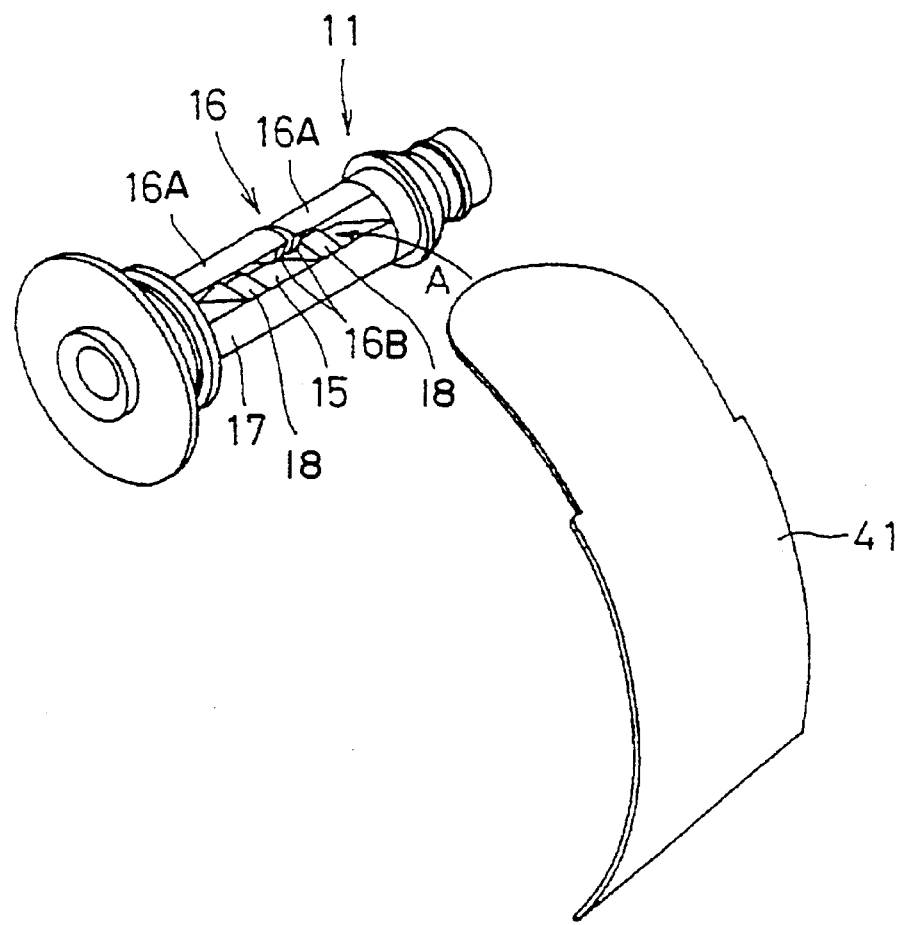
FIG. 8 is a perspective view which is used to illustrate the insertion of the separating member into a slit.
Figure 9:
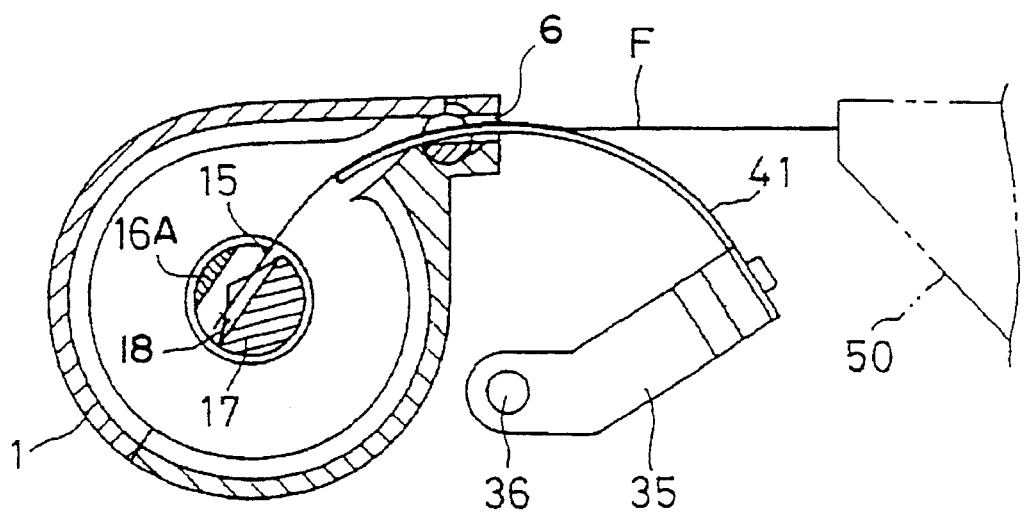
FIG. 9 is a sectional view of main portions which illustrates the insertion of the separating member into the slit.
Figure 10:
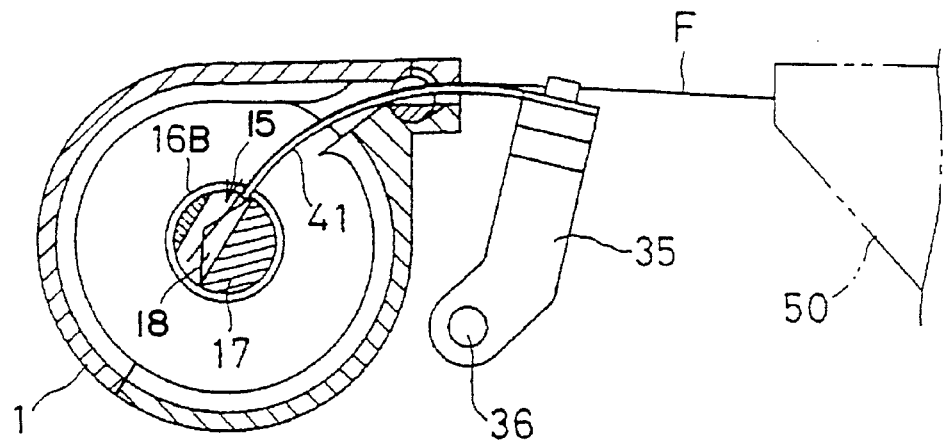
FIG. 10 is a sectional view of main portions which illustrates operation of the separating member.
Figure 11:
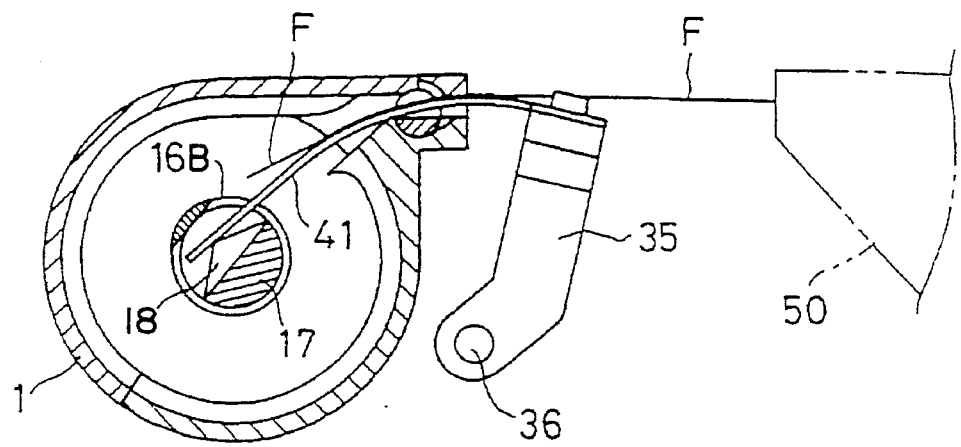
FIG. 11 is a sectional view of main portions which illustrates the separation of the photographic film from a spool.
Figure 12:
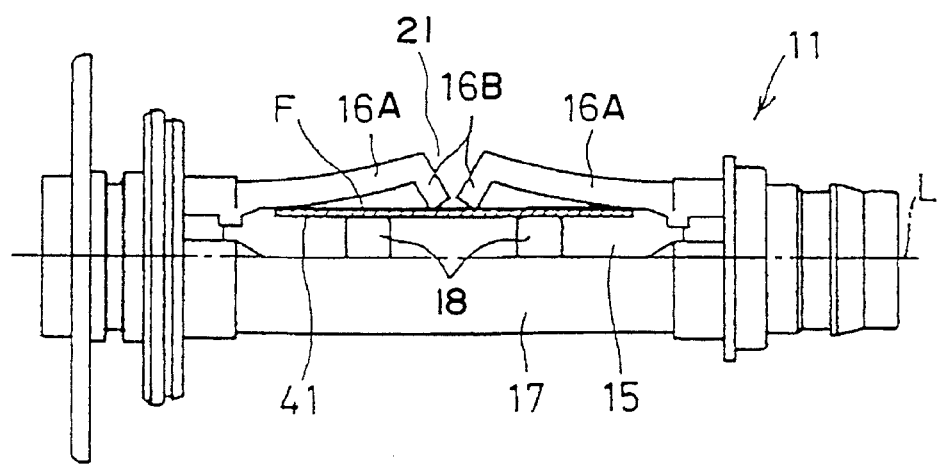
FIG. 12 is a front view of the spool and illustrates deformation of an upper side bar.

FIGS. 1 and 2 are external views which illustrate the structure of a spool. FIG. 3 is an exploded perspective view of a cartridge main body. FIG. 4 is a cutaway perspective view which illustrates an engaged state of a photographic film. FIG. 5 is a schematic structural view of a separating device. FIGS. 6 and 7 are side views which show examples of the shape of a separating member. FIG. 8 is a perspective view which illustrates the insertion of the separating member. FIGS. 9 through 11 are explanatory diagrams which illustrate a photographic film separating operation. FIG. 12 is a side view which illustrates the shape of the spool at the time of separation. Further, for the sake of convenience in describing the embodiments, the structures of the cartridge main body and the spool will be described first, after which the separating member and photographic film separating operation will be described.

First, the cartridge main body 1 (hereafter referred to simply as the "cartridge") will be described with reference to FIG. 3. The cartridge 1 is basically structured by an upper case 2 and lower case 3 which are molded as integral parts from a synthetic resin, and a spool 11 which is accommodated within the assembled upper case 2 and lower case 3 such that the spool 11 is freely rotatable. The spool 11 will be described in detail later with reference to FIGS. 1 and 2.

Port portions 2A and 3A are formed in the upper and lower cases 2 and 3. When the upper and lower cases 2 and 3 are assembled integrally, a film passage 6 is formed at the seam between the respective port portions 2A and 3A. A cover member 7 is installed between the port portions 2A and 3A. Rotary supporting portions 7A are provided at the respective end portions of the cover member 7, so that the cover member 7 is freely rotatable about an axis whose axial direction is parallel to the rotational axis of the spool 11.

A key 8 is provided on one end portion of one of the rotary supporting portions 7A and is exposed at the side surface of the cartridge 1. Further, by inserting a cover-opening member 9 into the key 8 from the exterior of the cartridge 1, and rotating the cover-opening member 9, it is possible to rotate the cover member 7 between a position at which the film passage 6 is open and a position at which the film passage 6 is closed.

As shown in FIGS. 1 and 2, a pair of flanges 11A are formed on the spool 11 so as to be integral with the spool 11. A photographic film F (not shown in the figures) is wound around a shaft portion 12 between the flanges 11A. As shown in FIG. 3, both ends of the spool 11 are exposed at the side surfaces of the cartridge 1, and a key 13 is provided on one of these exposed portions. The key 13 is used to engage a member which is used to drive the spool 11 when the spool is rotated. A cut-out 13A is formed in one end portion of the key 13.

Hereinafter, the structure of the shaft portion 12 will be described with reference to FIGS. 1 and 2. A slit 15 is formed in a substantially central portion of the shaft portion 12 in the axial direction thereof such that the slit 15 runs along the axial direction. An upper side bar 16 is located at one side portion of the shaft portion 12 divided by the slit 15, while a lower side bar 17 is located on the other side portion. The cross-sectional shape of the lower side bar 17 is such that one side surface is a flat-plate portion which is shaped as a flat plate, while the other side surface is circular arc shaped. As shown in FIG. 2, the flat-plate portion is formed so as to substantially coincide with a center line L of the shaft portion 12. Further, a pair of engagement pawls 18 is provided on the flat-plate portion as an engagement member which is used to engage the longitudinal direction trailing end of the photographic Film F. As shown in FIG. 3, tapered surfaces are formed on the sides of the engagement pawls 18 from which the separating member 41 (described later) is inserted, so that the insertion of the separating member 41 is facilitated. Further, the engagement member is not limited to the aforementioned engagement pawls 18, and any engagement member which engages the longitudinal direction trailing end of the photographic film F may be used.

The lower side bar 17 is formed by a single member, while the upper side bar 16 is formed by thin plate bodies 16A which extend along the axial direction from the end portions of the shaft portion 12, and which extend to a substantially intermediate portion of the shaft portion 12 in the longitudinal direction thereof. The cross-sectional configuration of each plate body 16A in a direction perpendicular to the longitudinal direction thereof is such that one side surface is shaped as a Flat plate, while the other side surface is circular arc shaped. Further, a tip end portion of each plate body 16A is bent downward so that a film presser pawl 16B is formed. The respective film presser pawls 16 oppose each other across a vertical slit 21. As shown in FIG. 3, tapered surfaces are formed on the sides of the film presser pawls 16B from which the separating member 41 (described later) is inserted, thus facilitating the insertion of the separating member 41.

Specifically, the upper side bar 16 is formed by two plate bodies 16A which extend from the respective ends of the shaft portion 12 with the ends serving as base portions for the plate bodies 16A, and the respective tip ends of the plate bodies 16A are separated at the position where the vertical slit 21 is formed. Therefore, the upper side bar 16 as a whole is elastic, and has a lowered rigidity. Further, as shown in FIG. 1, the width W1 of each plate body 16A which forms the upper side bar 16 is smaller than the width W2 of the lower side bar 17. The reason for this is that while the flat-plate portion of the lower side bar 17 is formed so as to coincide with the center line L, the flat-plate shaped portions of the respective plate bodies 16A are offset from the center line L by an amount corresponding to the width of the slit 15. Since the respective plate bodies 16A are thin and narrow, and since the plate bodies 16A are separated at the position where the vertical slit 21 is formed, the plate bodies 16A have a low rigidity.

Here, for convenience of description, the engaged state of the photographic film F will be described before the separation of the photographic film F is described. As shown in FIG. 4, a pair of engagement holes 22 are formed in the longitudinal direction trailing end portion of the photographic film F. Further, another pair of engagement holes 23 are formed at positions located at the outer sides of the engagement holes 22 in the transverse direction of the photographic film F. When the longitudinal direction end of the photographic film F is to be engaged with the spool 11, engagement pawls 25 formed on a leading end of an engagement member 24 are engaged with the engagement holes 23. In this state, the photographic film F and the engagement member 24 are inserted into the cartridge 1 (shown in FIG. 3) via the film passage 6 formed in the cartridge 1. Next, the longitudinal direction trailing end portion of the photographic film F is moved toward the spool 11 together with the engagement member 24.

When the photographic film F and the engagement member 24 are inserted into the slit 15, the pair of engagement holes 22 formed in the film F are engaged by the engagement pawls 18. Next, when the engagement member 24 is pulled, the engagement pawls 25 are pulled out from the engagement holes 23, so that the longitudinal direction trailing end of the photographic film F is engaged with the spool 11. At the same time, a substantially intermediate portion of the film F in the transverse direction thereof is pressed toward the flat-plate portion of the lower side bar 17 by the film presser pawls 16B, so that the engagement between the film F and the spool 11 is maintained. When the photographic film F is to be developed, the leading end of the Film F is pulled out of the cartridge 1, and developing processing is performed. When developing processing reaches the trailing end of the film F, the film F is separated from the spool 11. The basic operation performed during separation is as follows: the separating member 41 (described later) is inserted between the photographic film F and the lower side bar 17, and separation is accomplished by causing the photographic film F to rise upward from the lower side bar 17 so that the engagement between the engagement holes 22 and engagement pawls 18 is released.

Next, the structures of the film separating device and the separating member will be described along with the separation method with reference to FIG. 5 and the following drawings thereafter.

FIG. 5 illustrates the schematic structure of a photographic film separating device 30. This device may be utilized in either a dark room or a light room. A receiving portion 32 which corresponds to the external shape of the cartridge 1 is formed in a base block 31, which serves as a holder, such that the cartridge 1 is supported as shown in the figures. Further, a presser arm 83, which serves as a holder and which is driven by, for example, a hydraulic cylinder device or a link mechanism (neither of which is shown in the figures), is axially supported on the base block 31, so that the supplied cartridge 1 can be pressed into the receiving portion 32.

In a state in which the cartridge 1 is pressed into place by the presser arm 33, the cartridge 1 is held in a fixed posture by the shape of the receiving portion 32 and the position of a port portion receiving portion 34. The entry of the film passage 6 is also positioned in a fixed position. Further, the holder is not limited to the above-mentioned base block 31 and presser arm 33, and any holder which is capable of holding the cartridge 1 may be used.

A pair of arms 35 are axially supported at respective surfaces of the base block 31 (i.e., the surfaces located in the axial direction of the spool 11 when the cartridge 1 is held in the base block 31) by a shaft 36 which is provided at the base block 31. The arms 35 rotate reciprocally about the shaft 36 due to the driving of a stepping motor (not shown in the figures). The driving apparatus used here is not limited to a stepping motor, and some other type of driving apparatus may be used. The respective arms 35 are connected by an attachment plate 37. One end of the separating member 41 whose side surface shape (i.e., the shape seen from the direction perpendicular to the page in FIG. 5) is a circular arc is fixed to the attachment plate 37.

Figure 6A:
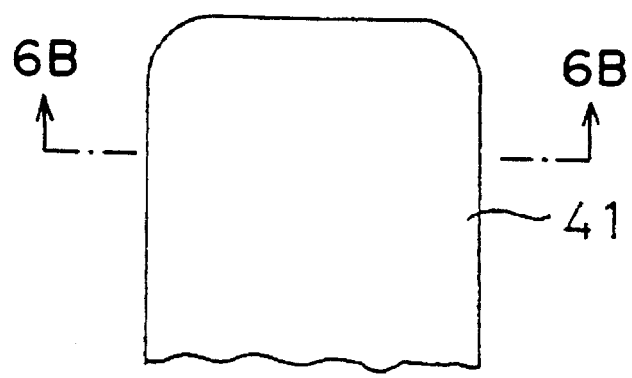
FIG. 6A is a front view which illustrates an embodiment of a separating member.
Figure 6B:
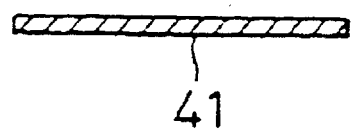
FIG. 6B is a sectional view taken along line 6B—6B of FIG. 6A.
Figure 6C:
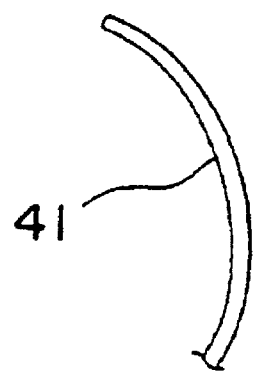
FIG. 6C is a left-side view of the separating member shown in FIG. 6A.

The separating member 41 is formed by a metal plate. As shown in FIGS. 6B and 7B, the cross-sectional shape of the separating member 41 in the transverse direction is rectangular. However, the shape of the side surface of the separating member 41 is curved as shown in FIGS. 6C and 7C. The tip end portion of the separating member 41, which is inserted into the slit 15 formed in the spool 11, is shaped such that the corner portions thereof are rounded as shown in FIG. 6A, i.e., a shape in which R is applied to the corner portions, or a shape in which the tip end portion as a whole is rounded as shown in FIG. 7A. The tip end of the separating member 41 is shaped so as to penetrate to the positions of the engagement pawls 18 and the film presser pawls 16B formed at the spool 11 at substantially the same time, so that the separating member 41 can penetrate between the photographic film F and the respective engagement pawls 18 simultaneously and reliably. Further, a film receiving device 50 is connected to a film developer. The receiving device 50 pulls in an unillustrated photographic film F, which has been photographed and has been pulled out of the cartridge 1, and automatically conveys the film F to an automatic film developing device.

When the photographic film F is to be separated from the spool 11 the separating member 41 is pivoted about the shaft 36 in the direction indicated by arrow A (as shown in FIG. 5), so that the separating member 41 is inserted into the cartridge 1. The separating member 41 is pivoted further so that it is inserted into the slit 15 (as shown in FIG. 8). The photographic film F is then separated from the engagement pawls 18 as was described above with reference to FIG. 4. Hereinafter, the separating operation will be described in greater detail with reference to FIGS. 9 through 12. As shown in FIG. 9, when the photographic film F has been pulled out of the cartridge 1 as far as the longitudinal direction trailing end portion of the film F, the pair of arms 35 are caused to rotate about the shaft 36 in the counter-clockwise direction, so that the tip end of the separating member 41 is inserted into the cartridge 1 from the film passage 6.

When the arms 35 are rotated even further, the separating member 41 is inserted into the slit 15 as shown in FIG. 10. As a result, the tip end portion of the separating member 41 is positioned between the film F and the flat-plate portion of the lower side bar 17, and thus pushes the film F upward so that the film F separates from the flat-plate portion of the lower side bar 17. Since taper surfaces are respectively formed on the sides of the engagement pawls 18 and the film presser pawls 16B from which the separating member 41 is inserted, the insertion of the separating member 41 can easily be accomplished by using a small force. As a result, the engagement between the engagement holes 22 and engagement pawls 18 is released. Accordingly, if the photographic film F, which is now simply nipped between the separating member 41 and the film presser pawls 16B, is pulled to the right (with respect to the figures), the entire photographic film F can be pulled out of the cartridge 1 as shown in FIG. 11. After the engagement of the trailing end portion of the photographic film F has thus been released, the separating operation of the photographic film F is completed by rotating the pair of arms 35 in the clockwise direction so that the separating member 41 is moved back to its original position.

By using the structures of the spool 11 and separating member 41 illustrated in the present embodiment, it is possible to separate the photographic film F easily and without damaging to the photographic film F, by means of a small force.

Specifically, the separating member 41 is formed from a metal plate, and has high rigidity. On the other hand, the upper side bar 16 formed at the spool 11 is formed by the pair of plate bodies 16A which extend from the respective ends of the spool 11, and the upper side bar 16 thus has low rigidity. Further, the tip ends of the plate bodies 16A are bent downward to form the presser pawls 16B. Accordingly, when the separating member 41 is inserted from the slit 15 and then slides upward along the inclined surfaces of the engagement pawls 18 from the underside of the photographic film F, the engagement of the engagement pawls 18 and the engagement holes 22 is canceled.

As a result, the plate bodies 16A are deformed such that the tip end portions thereof are lifted upward, with the aforementioned vertical slit 21 acting as a boundary between the two plate bodies 16A, as shown in FIG. 12. If the photographic film F is pulled in this state, the film F can easily be pulled out by a small force, so that damage to the photographic film F, such as tearing or the like, can be prevented.

Next, a second embodiment of the present invention will be described with reference to FIG. 18. The difference between the present embodiment and the above-described first embodiment are that in the present embodiment, the diameter of the spool is increased and the structure of the upper side bar is modified. Accordingly, members which perform the same operations as those in the above-described first embodiment are labeled with the same symbols, and description of such members is omitted.

In the spool 11 used in the present embodiment, a pair of film winding portions 46A are formed on an upper side bar 45 which is formed by a single member. The film winding portions 46A are formed so as to be spaced apart by a predetermined interval in the longitudinal direction of the upper side bar 45. Further, a concave portions is formed at an intermediate position between said pair of film winding parts 46A in the longitudinal direction of the upper side bar 45, thus forming a film presser pawl 46B. Since the upper side bar 45 as a whole is formed so to have a small thickness, the bar 45 has low rigidity in spite of the formation of the convex and concave film winding parts 46A and film retaining pawl 46B. Accordingly, the upper side bar 45 as a whole readily undergoes flexible deformation. Further, when the separating member 41 is not inserted into the slit 15, the upper side bar 45 as a whole has the shape indicated by the solid lines in FIG. 13. Accordingly, if the photographic film F is engaged by the engagement pawls 18 as indicated by the dotted line, the transverse direction central portion of the photographic film F is pressed by the film presser pawl 46B so that undesired removal of the photographic film F from the engagement pawls 18 can be prevented.

Figure 13:
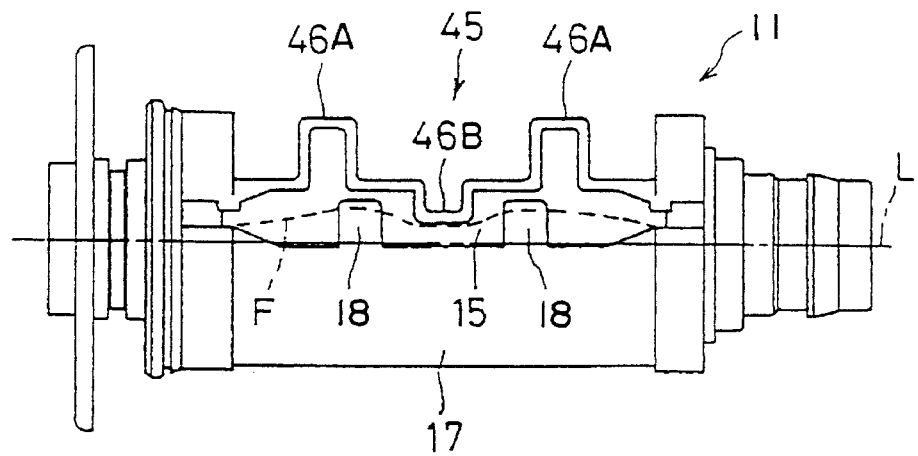
FIG. 13 is a front view of the spool and illustrates a second embodiment of the present invention.

Further, in the state shown in FIG. 13, the distance from the center line L to the outside surface of the film winding portion 46A is the same as the distance from the center line L to the outside surface the lower side bar 17. Accordingly, when viewed from the axial direction, the spool 11 has a circular shape except for a step portion caused by the formation of the slit 15. Thus, the photographic film F can be wound without any creases or the like forming therein.

When the separating member 41 is inserted into the slit 15 in order to remove the photographic film F, the film pusher pawl 46B is pushed outward by the separating member 41, so that the upper side bar 45 as a whole is moved upward and curvingly deforms. Accordingly, as in the above-described first embodiment, the photographic film F can be pulled out by a small force when the separating member 41 is inserted into the slit 15. Further, damage to the photographic film F can be reduced. Moreover, when the separating member 41 is pulled out of the slit 15, the upper side bar 45 returns to its original shape, i.e., the shape indicated by the solid lines in FIG. 13, so that the next photographic film F can be wound.

Next, embodiments relating to a cartridge supply device and a cartridge accommodating device which are moved toward a film feed-out portion will be described with reference to FIGS. 14 through 20. These embodiments relate to a container case which accommodates the cartridges 1. For example, such a container case is ideal for use in cases where cartridges containing developed photographic films are returned to the users, or in cases involving the insertion or removal of photographic film, or in cases in which empty cartridges containing no photographic film are processed, e.g., moved or the like.

Figure 14:
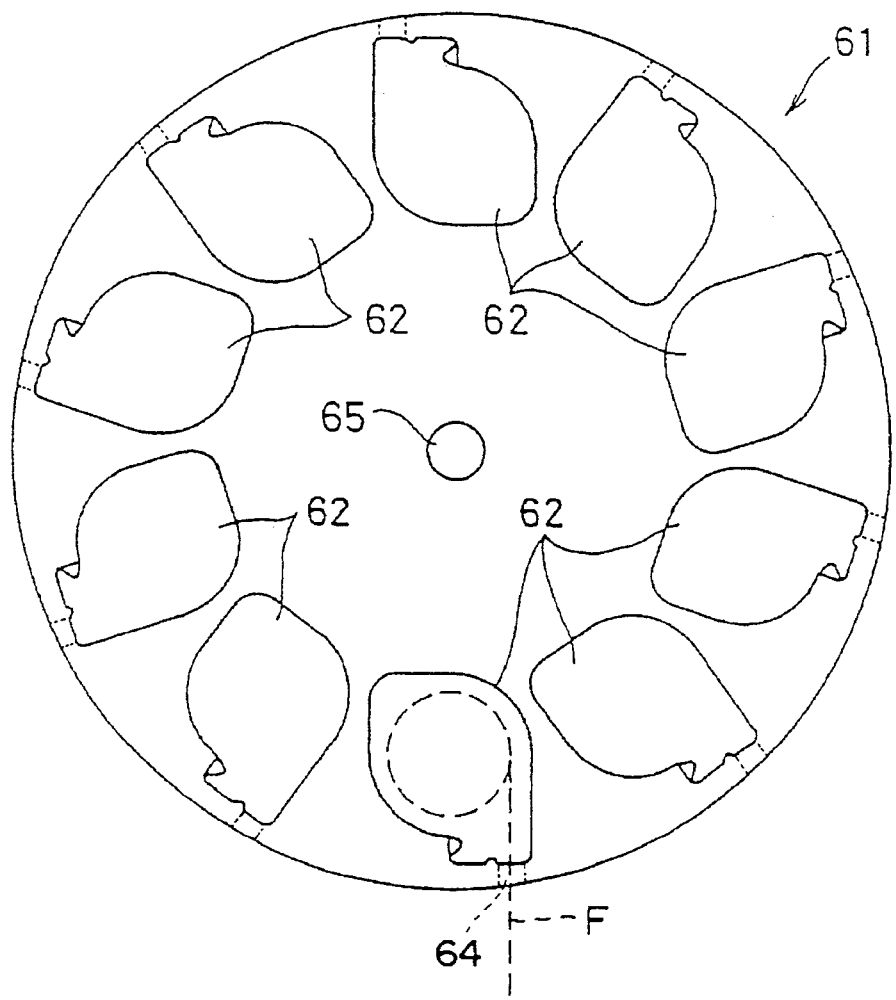
FIG. 14 is a front view of a first embodiment of a container case used in the present invention.
Figure 15:
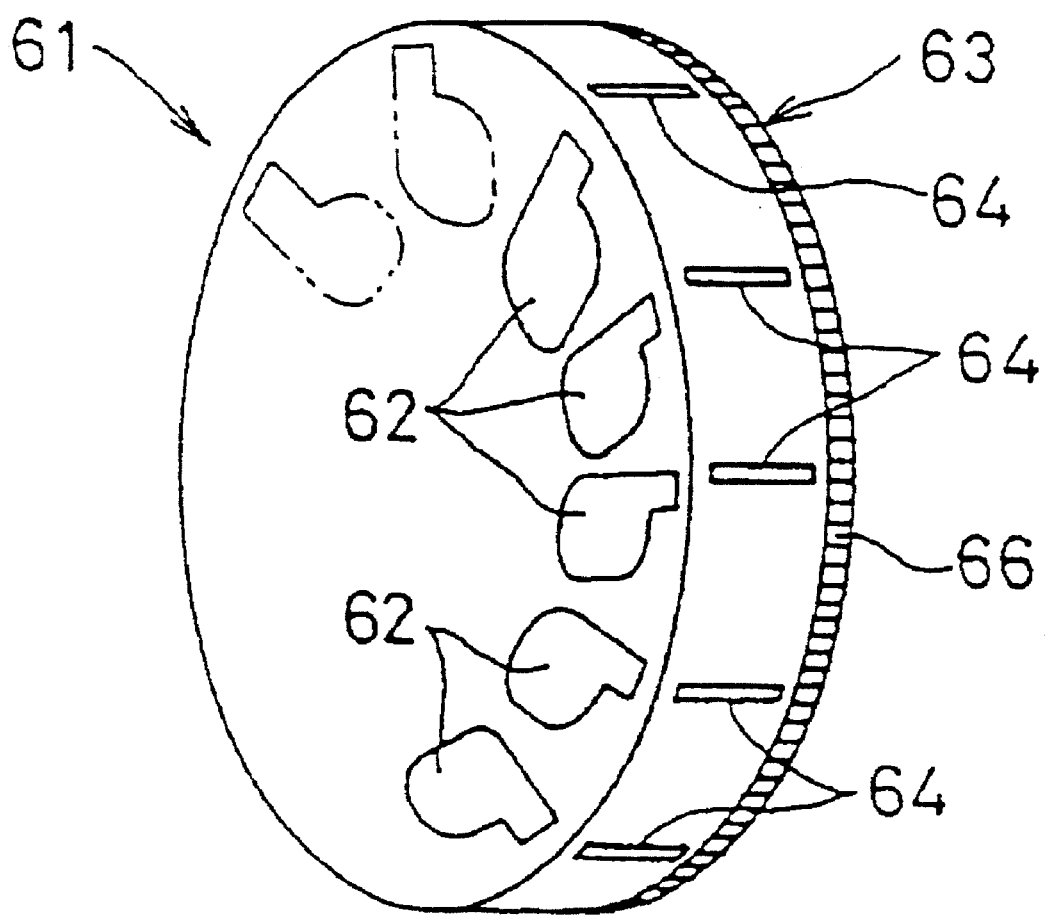
FIG. 15 is a perspective view of the first embodiment of the container case used in the present invention.

First, a first embodiment of the container case 61 will be described with reference to FIGS. 14 and 15. The container case 61 in the present embodiment is constructed such that cartridges can be inserted or removed "revolver-style" and such that the photographic film can be pulled out of the cartridges. Specifically, ten cartridge accommodating portions 62 are formed in the container case 61, which is formed in a disk-shape from a synthetic resin. The cartridge accommodating portions 62 have substantially the same shape as the cartridges 1, so that said cartridges 1 (not shown in the figures) can be inserted or removed from one side surface of the container case 61 in the direction of thickness thereof. The other side surface of the container case 61 in the direction of thickness thereof is blocked off by a blocking plate 63. Further, slits 64 which are used to pull the photographic film out of the cartridges 1 accommodated in the cartridge accommodating portions 62 are formed in the outer circumferential surface of the container case 61. In addition, a gear 66, which receives driving force from a driving apparatus connected to an unillustrated or the like so as to cause rotation of the container case 61 about a shaft 65, is formed on the outer circumferential surface of the blocking plate 63.

Accordingly, by causing the aforementioned driving apparatus connected to a motor or the like to engage with the gear 66, the container case 61 can be made to rotate about the shaft 65 and stop at predetermined positions, so that photographic film can be pulled out from the slits 64, or conversely, wound into the cartridges. Further, the width of the container case 61 is set at, for example, approximately 48 to 50 mm. In the present embodiment, a case is described in which the number of cartridge accommodating portions 62 is ten. However, the number of cartridge accommodating portions 62 is not limited to the number used in the present embodiment.

Next, a case in which cartridges, from which photographic films have been removed, are accommodated in order in the cartridge accommodating portions 62 will be described as one example of a method of use of the container case 61. In this case, ID (identification) numbers attached to the cartridges are read and are stored, along with the addresses (i.e., order) of the cartridge accommodating portions 62 accommodating the cartridges, in a memory circuit which forms an unillustrated control device provided at the container case 61. When photographic films are to be wound into the cartridges, the stored ID numbers and the ID numbers of the accommodated cartridges are directly read, or the cartridges are temporarily removed from the container cases 61 and the ID numbers are read and compared with the stored ID numbers. Then, the photographic films are wound into the cartridges.

In order to stabilize the posture of the cartridges, accommodation and removal of the cartridges are performed from the axial direction of the container case 61. The taking up and pulling out of the photographic films F are accomplished by using the slits 64 as indicated by the dotted line in FIG. 14.

Figure 16:
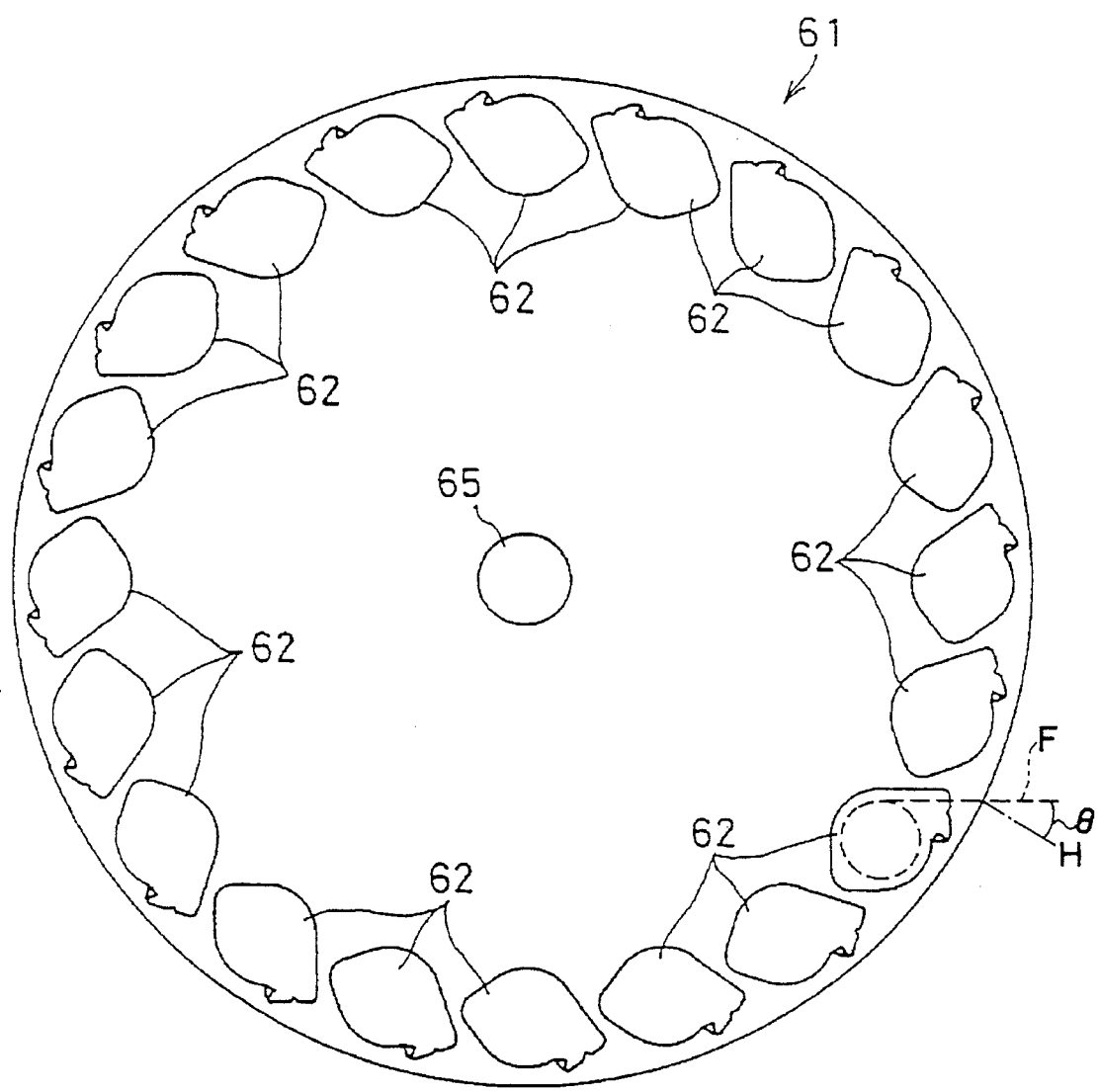
FIG. 16 is a front view which illustrates a second embodiment of the container case used in the present invention.

Next, a second embodiment of the container case 81 will be described with reference to FIG. 16. The difference between the present embodiment and the above-described first embodiment are that in the present embodiment, the number of cartridge accommodating portions 62 is increased to 20 and the diameter of the container case 61 is increased. Moreover, in the present embodiment, the cartridge accommodating portions 62 are formed so as to be inclined by a predetermined angle about the axes of the spools of the accommodated cartridges with respect to the positions of the cartridge accommodating portions 62 in the aforementioned first embodiment. Accordingly, the photographic film F is pulled out or taken up at a prescribed angle a with respect to a normal H of the outer circumferential surface of the container case 61, as indicated by the dotted line in FIG. 16.

The other side surface of the container case 61 is blocked off by the blocking plate 63 (not shown in the figure) as in the above-described first embodiment, and rotary driving is also accomplished by the gear 66 as in the first embodiment. Further, the method used to accommodate the cartridges is also the same as in the first embodiment, and the taking up and pulling out of the photographic film F are accomplished by using the slits as indicated by the dotted line in FIG. 16.

Figure 17:
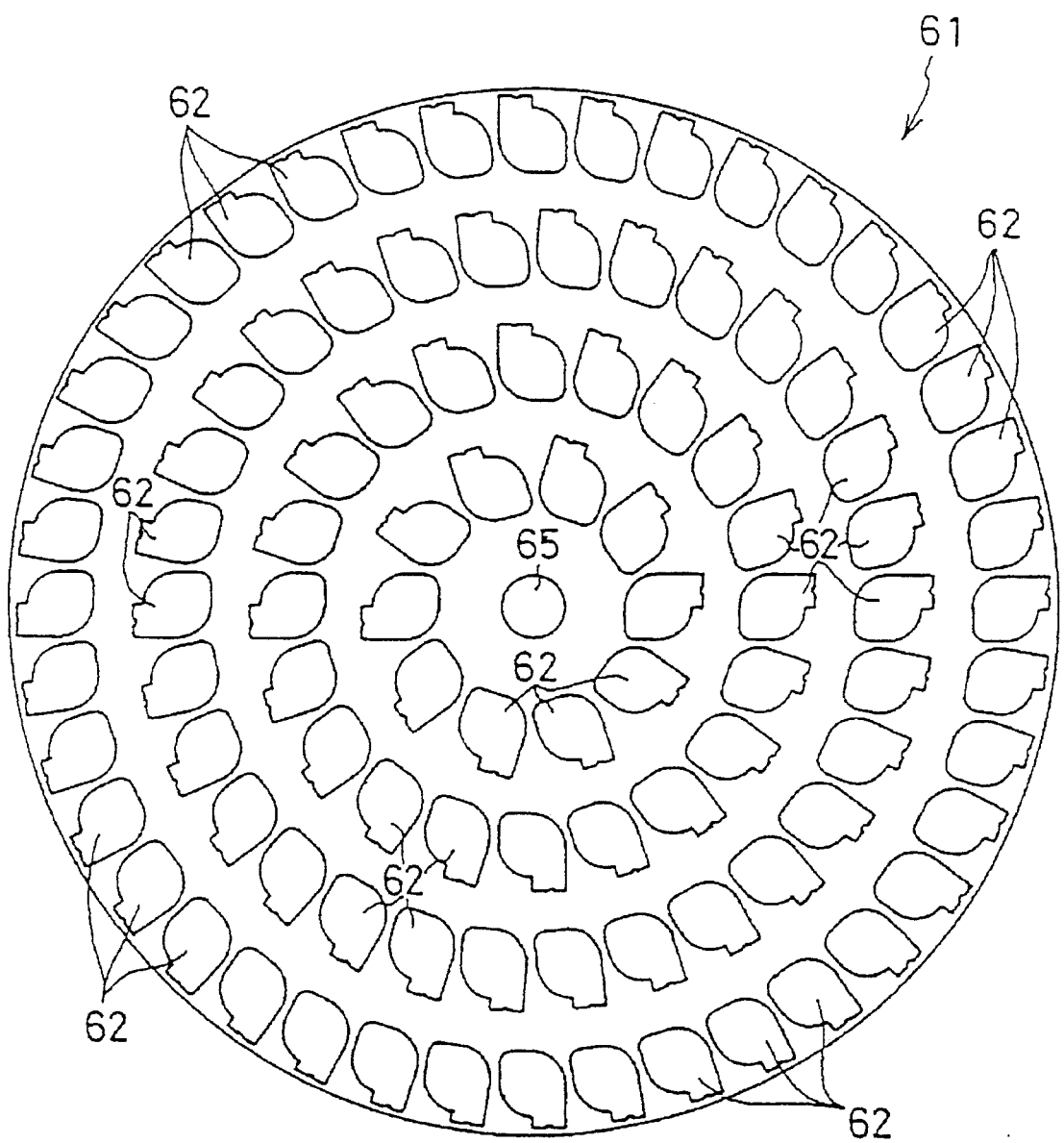
FIG. 17 is a front view which illustrates a third embodiment of the container case used in the present invention.

Next, a third embodiment of the container case 61 will be described with reference to FIGS. 17 and 18. The container case 61 in the present embodiment has 100 cartridge accommodating portions 62. The blocking plate 63 provided at the other side surface of the container case 61 and the gear 66 used as a rotary driving mechanism are constructed in the same manner as in the above-described first and second embodiments. In the present embodiment, the cartridge accommodating portions 62 are formed in four ranks from the shaft 65 in the radial direction thereof. Accordingly, for cartridges accommodated in the outermost cartridge accommodating portions 62, the photographic films can be pulled out or taken up via the slits 64 (not shown in the figures) in the same manner as in the aforementioned embodiments. However, with respect to cartridges accommodated in the cartridge accommodating portions 62 formed further inward in the radial direction, the photographic films cannot be pulled out or taken up via the aforementioned slits 64.

Figure 18:
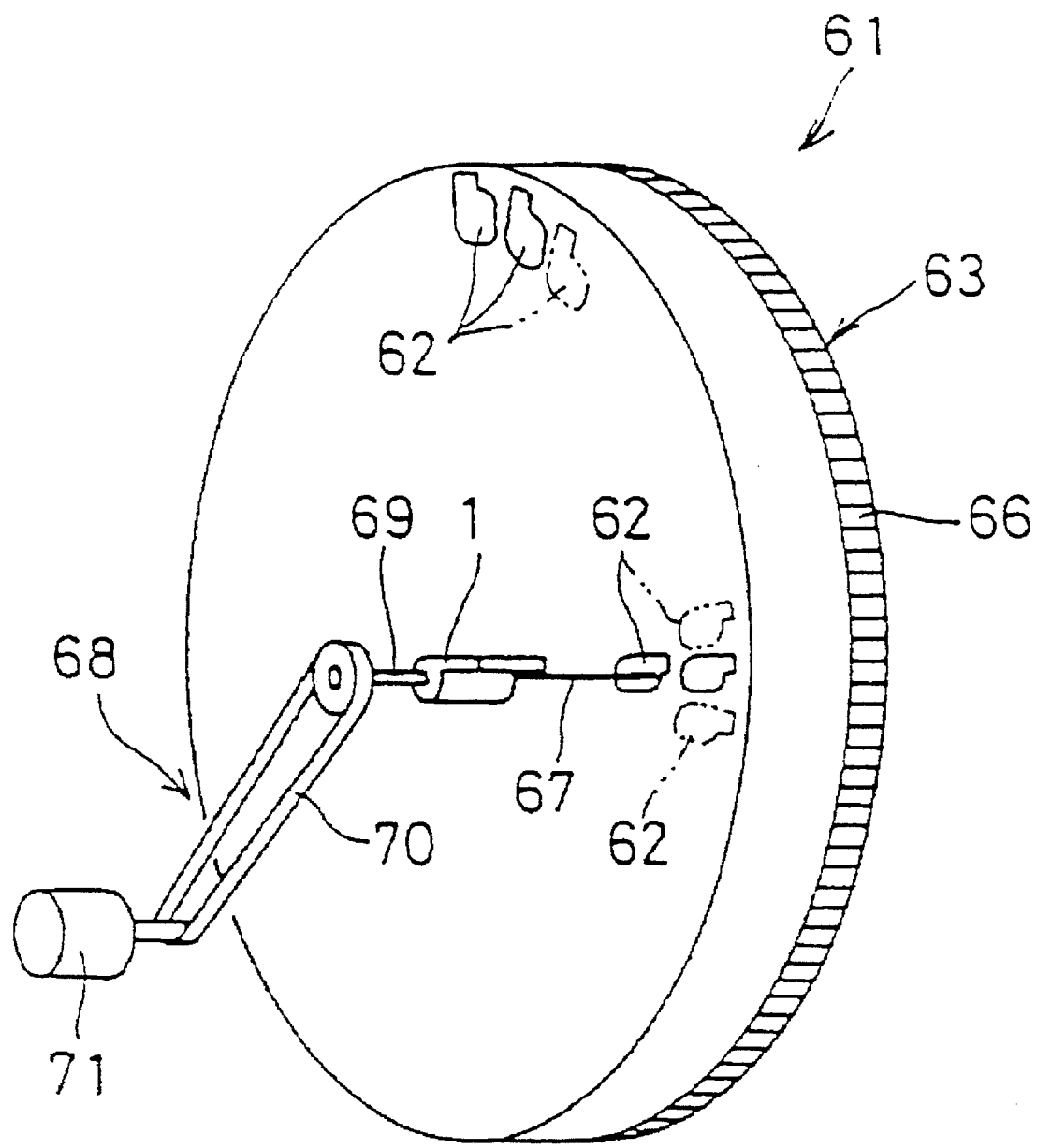
FIG. 18 is a perspective view which is used to illustrate operation of the third embodiment of the container case used in the present invention.

Accordingly, in the present embodiment, a rod-shaped push-out member 67 which is used to push the cartridges 1 out from the other side surface of each cartridge accommodating portion 62 is provided as shown in FIG. 18. Further, a rotary driving mechanism 68 which is used to pull out or take up the photographic film for the cartridges 1 which have been pushed out is also provided. This rotary driving mechanism 68 engages with the key 13 (not shown in the figures) provided at each cartridge 1, and is formed by a rotating member 69 which rotates the spool 1, a belt 70, a motor 71, and the like.

The accommodation of the cartridges 1 in the respective cartridge accommodating portions 62 is effected in the same manner as in the above-described embodiments. When the respective cartridges 1 are to be removed from the cartridge accommodating portions 62, the stored ID numbers of the cartridges 1 are read out, and the push-out member 67 is driven. As a result, the cartridges 1 are removed by being pushed out and moved from the cartridge accommodating portions 62 as shown in FIG. 18. When each cartridge 1 is moved from its cartridge accommodating portion 62, the rotating member 69 engages with the key 13, and the motor 71 is rotated so that the photographic film is wound on the spool 11.

Figure 19:
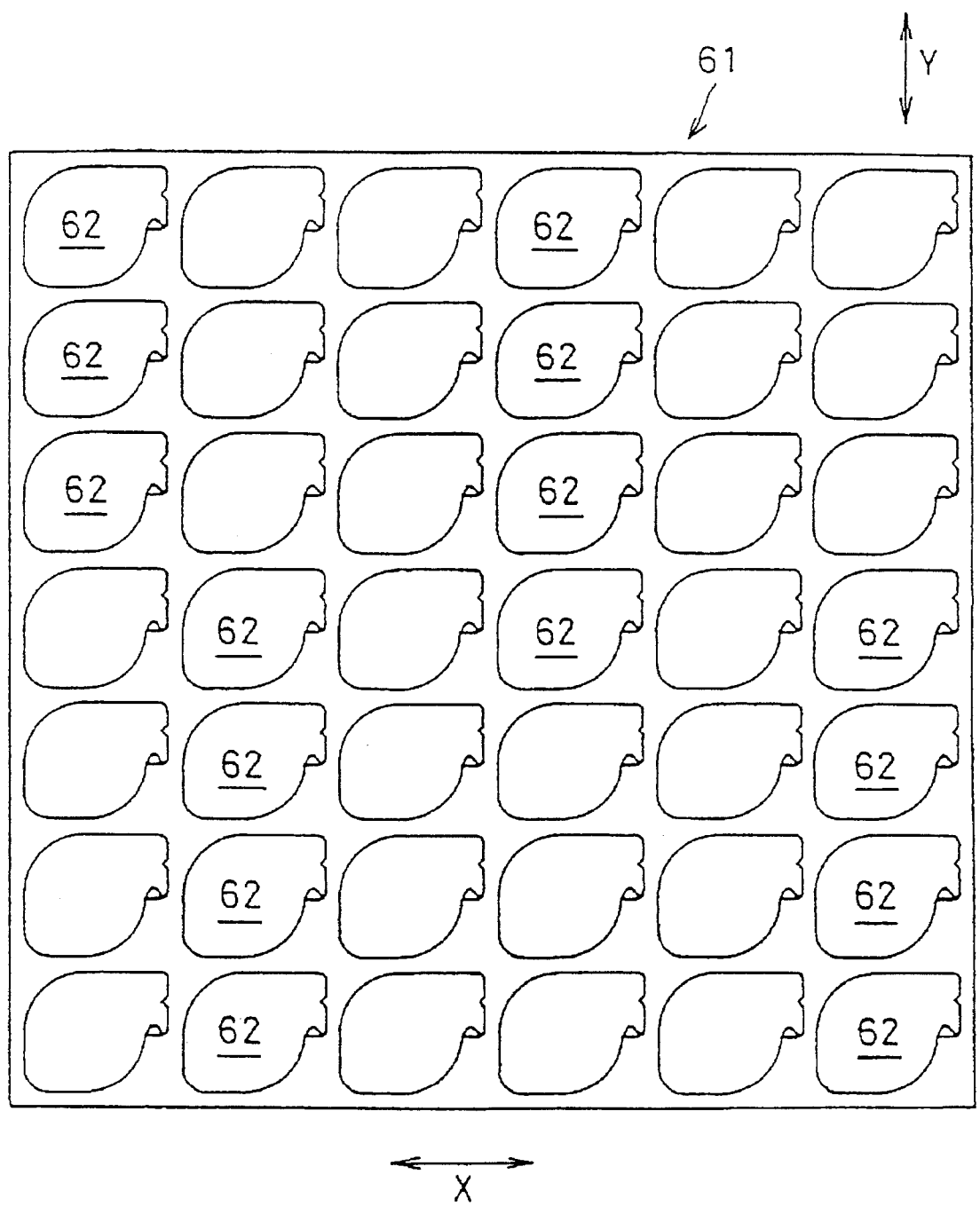
FIG. 19 is a front view which illustrates a fourth embodiment of the container case used in the present invention.
Figure 20:
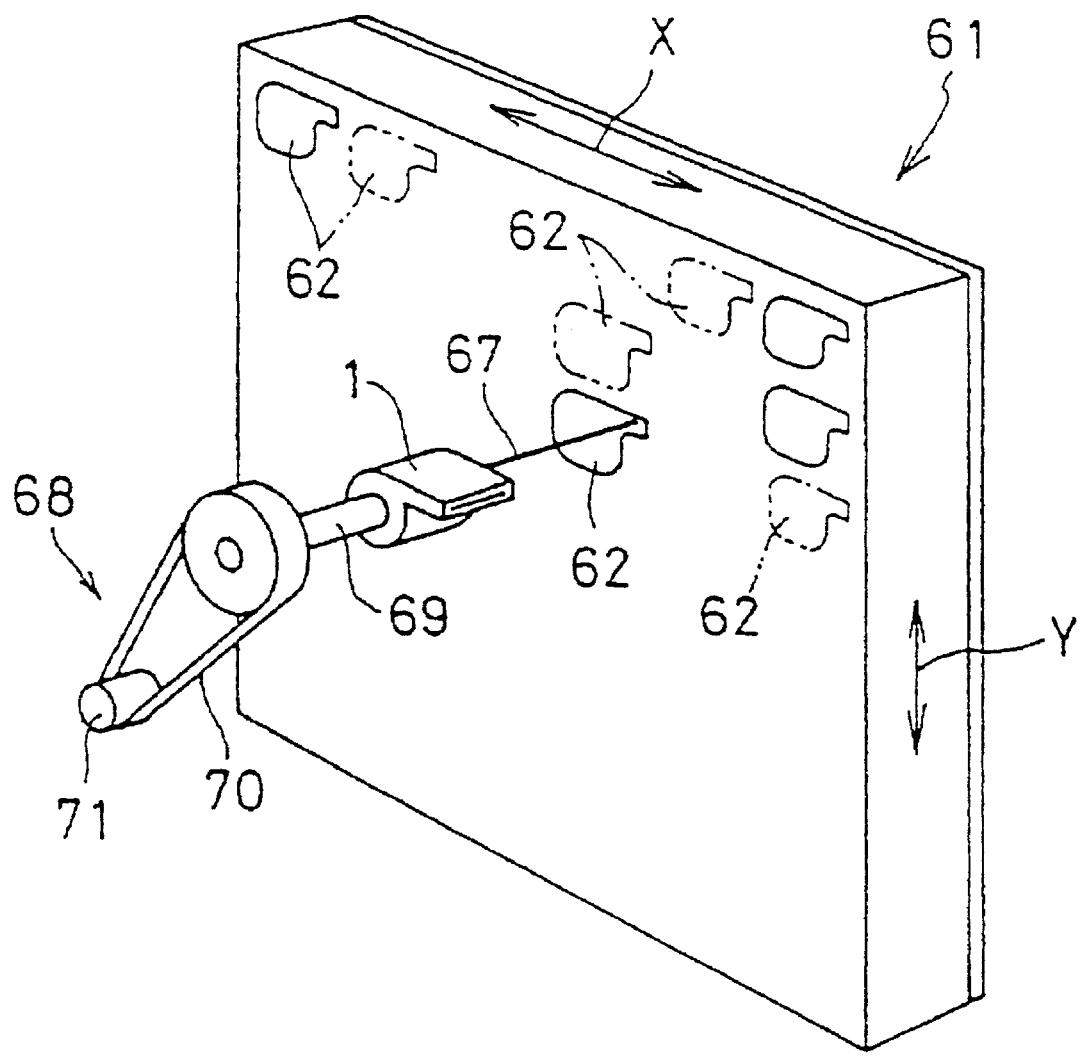
FIG. 20 is a perspective view which is used to illustrate operation of the fourth embodiment of the container case used in the present invention.

Next, a fourth embodiment of the container case 61 will be described with reference to FIGS. 19 and 20. Further, the container case 61 in the present embodiment is formed in a square shape, and has, for example, 42 cartridge accommodating portions 62. The blocking plate 63 provided at the other side surface of the container case 61 is constructed in the same manner as in the above-mentioned embodiments. Here, the container case 61 is constructed so that it can be moved in the vertical and horizontal directions (as indicated by arrows X and Y) by a moving apparatus not shown in the drawings. This movement may be accomplished by forming a gear at the periphery of the blocking plate 63 and applying a driving force to the container case 61 via this gear. Alternatively, a different moving apparatus may be provided.

Further, when cartridges are to be accommodated in the respective cartridge accommodating portions 62, the cartridge ID numbers and the numbers of the cartridge accommodating portions 82 are stored as in the aforementioned embodiments.

When cartridges 1 accommodated in the cartridge accommodating portions 82 are to be removed from the accommodating portions 62, the stored ID numbers of the cartridges 1 and the stored address numbers of the cartridge accommodating portions 62 are compared, and the push-out member 67 is driven so that the corresponding cartridges 1 are removed by being pushed out. When each cartridge 1 is pushed out, the rotating member 69 engages with the key 13 (not shown in the figures) provided on the cartridge 1, and the motor 71 is rotated so that the rotating member 69 is rotated via the belt 70, thus winding the photographic film onto the spool 11.

Figure 21:
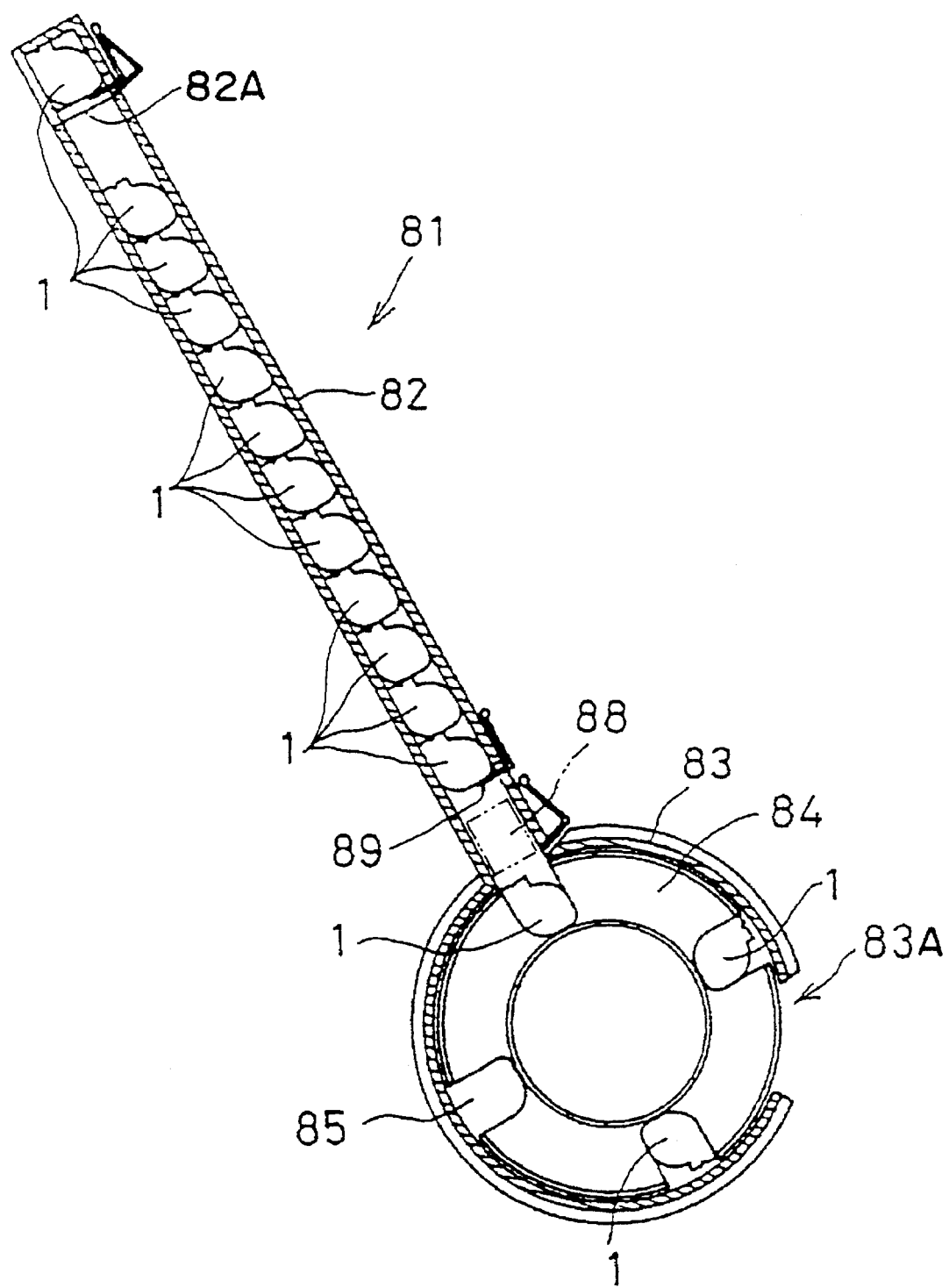
FIG. 21 is a schematic structural view which illustrates another embodiment of a cartridge supply device.

Next, another embodiment of the cartridge supply device will be described with reference to FIGS. 21 and 22. Further, this embodiment is suitable for use in supplying cartridges to an automatic developing device or the like.

The cartridge supply device 81 is formed by a hopper portion 82 which is provided so as to be inclined in the longitudinal direction thereof so that the cartridges 1 will fall smoothly, a cylindrical guide frame 83 which is provided at the lower end of the hopper portion 82, and a circular rotary nest 84 which is provided so as to be freely rotatable within the aforementioned guide frame 83. The hopper portion 82 is formed in the shape of an elongated hollow rectangular column or a chute so that the cartridges 1 can fall smoothly in a fixed posture. A supply port 82A which is used to supply the cartridges 1 is formed in the upper end portion of the hopper portion 82. Four cut-out cartridge accommodating portions 85, for example, are formed in the rotary nest 84 at 90-degree intervals so that the cartridges 1 are maintained in a fixed postures.

The opening portions of the cartridge accommodating portions 85, which are opened at the circumferential surface of the rotary nest 84, are positioned in accordance with the rotational position of the rotary nest 84 in a position which communicates with the hopper portion 82, a position which is closed off by the guide frame 83, or a film pull-out position 83A which is formed by cutting away a portion of the guide frame 83. Further, when the hopper portion 82 does not communicate with any of the cartridge accommodating portions 85, the lower end opening portion of the hopper portion 82 is closed off by the outer circumferential surface of the rotary nest 84 as shown in FIG. 22. In this case, the supply of cartridges 1 is stopped until the rotary nest 84 rotates so that the next cartridge accommodating portion 85 communicates with the hopper portion 82. The rotary nest 84 may rotate in either the clockwise direction or the counterclockwise direction.

Figure 22:
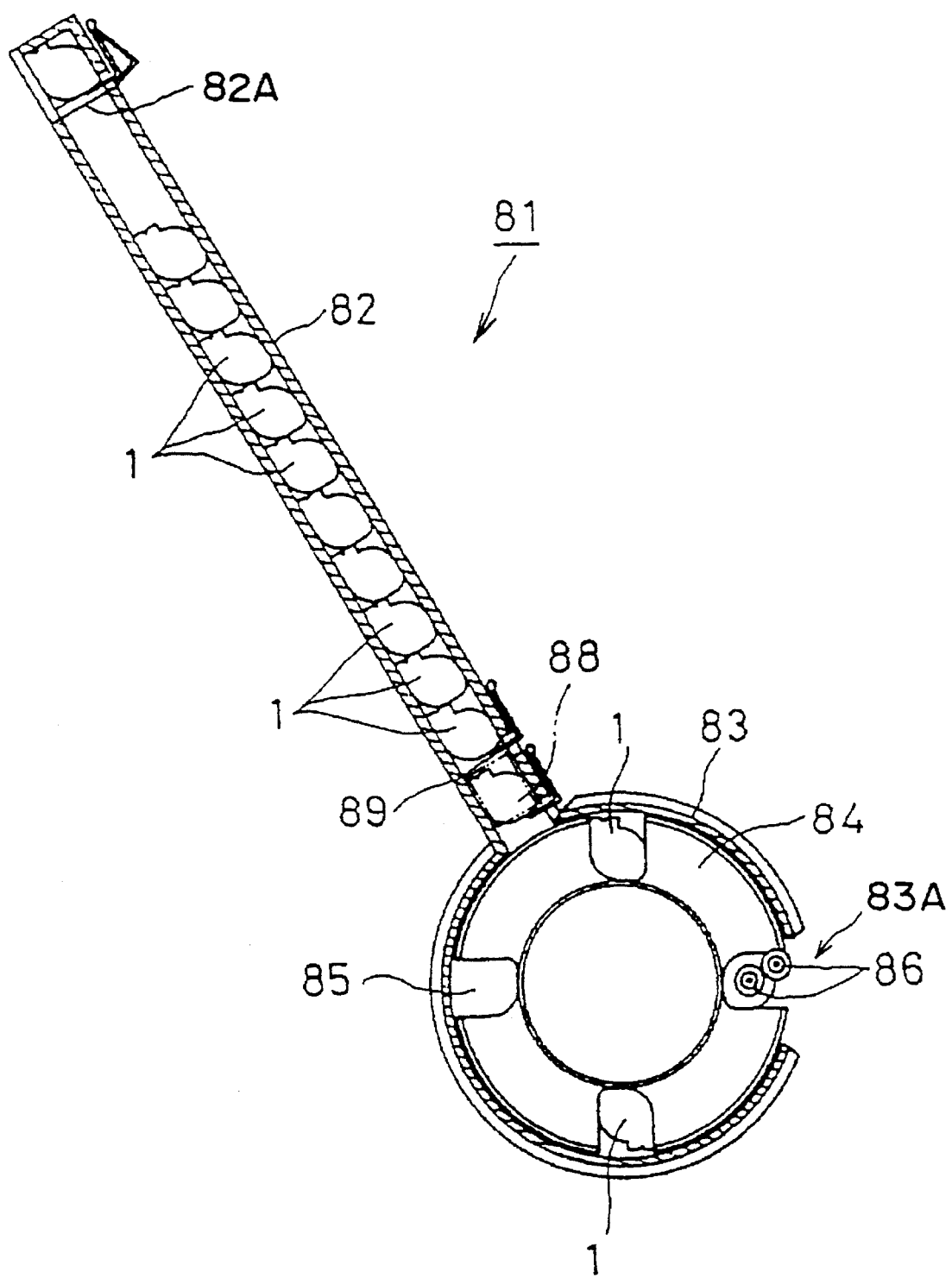
FIG. 22 is a schematic structural view which is used to illustrate operation of the cartridge supply device shown in FIG. 21.

As shown in FIG. 22, feed-out rollers 86 are provided at the film pull-out position 83A. When a cartridge 1 is positioned at the film pull-out position 83A as a result of the rotation of the rotary nest 84, the photographic film is nipped by the feed-out rollers 86 from the direction of thickness thereof, and is pulled out and supplied to, for example, an automatic developing device.

In the cartridge supply device 81 constructed as described above, cartridges 1 can be successively supplied to the photographic film pull-out position 83A by supplying the cartridges 1 to the hopper portion 82. Accordingly, the operator need only supply cartridges 1 to the hopper portion 82. Since the rotary nest 84 is constructed as a revolver-type system, film processing can be continuously performed by rotating the rotary nest 84.

Since the photographic film is pulled out while the cartridges 1 are held in the rotary nest 84, the hopper portion 82 need not be formed as a light-shielding structure. If the hopper portion 82 is constructed from a transparent member, the number of cartridges 1 remaining in the hopper portion 82 can be visually observed, thus simplifying the supply operation. Further, in the cartridge supply device 81, it is possible to monitor the cartridges 1 by providing a bar code reader at the rotary nest 84 or at the supply port 82A of the hopper portion 82, or at both of these positions.

A discharge opening 88 which can be freely opened and closed is formed in the hopper portion 82. Accordingly, improper films, e.g., a black and white film mixed in among color films or a film requiring a different type of developing processing such as reversal developing processing or the like, can be discerned by the aforementioned bar code reader and discharged from the discharge opening 88. The discharged cartridges 1 are then placed in an accommodating container such as a container case or the like.

By using the structure described above, it is possible to carry out the supply of cartridges 1, the pulling out of photographic film and the discharge of cartridges 1 successively and in parallel.

Since the hopper portion 82 is set in an inclined position, the cartridges 1 naturally fall downward. Accordingly, there is no need to provide a special driving mechanism. Further, a shutter 89 is appropriately provided, and acts together with the internal dimensions of the hopper portion 82 to maintain the postures of the cartridges 1. The effects of the inclination of the hopper portion 82 and the center of gravity of each cartridge 1 cause the cartridges to maintain a fixed posture. However, an unillustrated bristled member, which is used to maintain the posture of a cartridge, may be provided in the upper portion of the hopper portion 82 for use in cases where the posture of a cartridge is not the desired posture for clearance inside the hopper portion 82, and to correct the posture of the cartridge 1 to the desired posture by means of frictional resistance of the bristled member.

Figure 23:
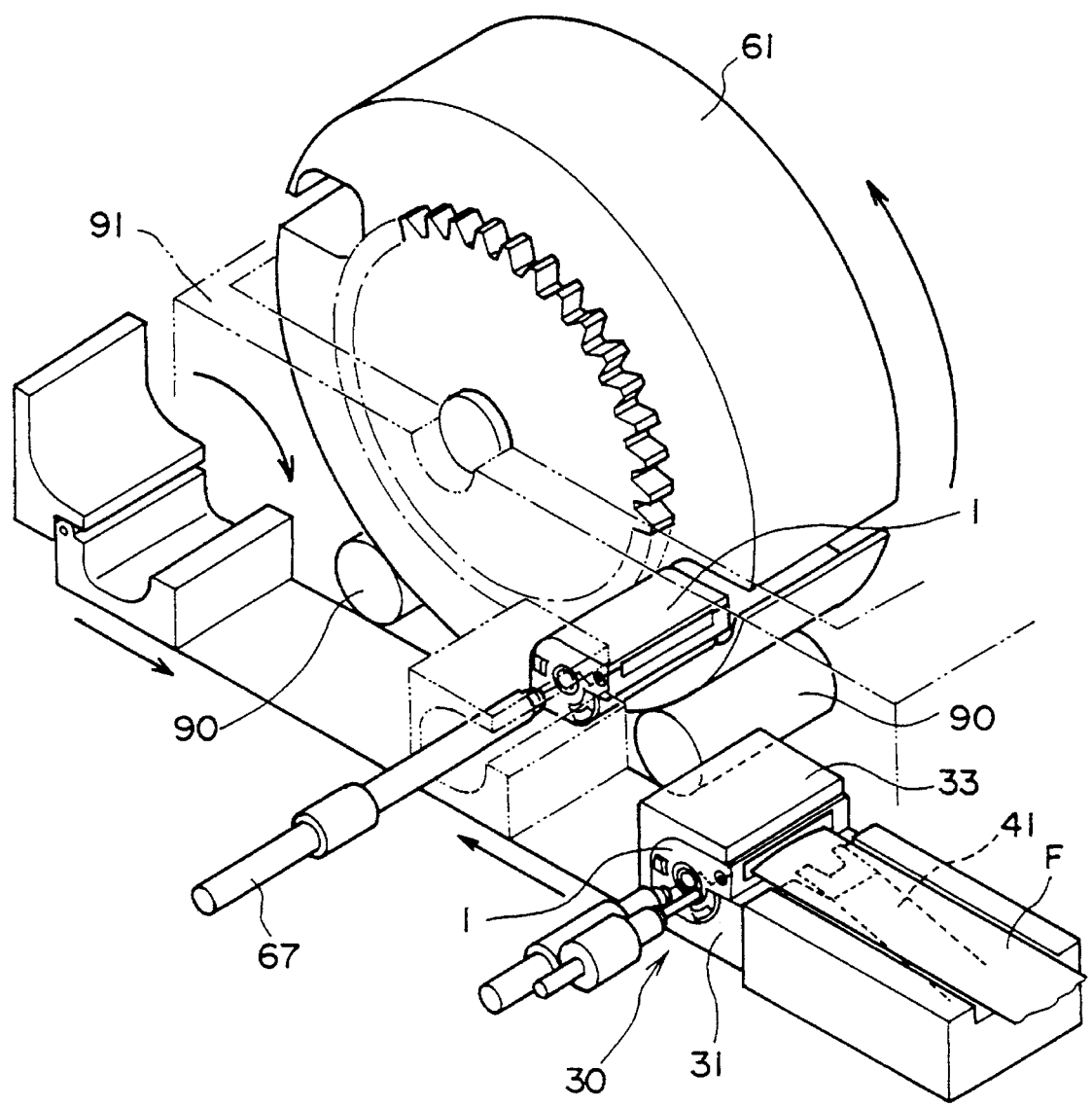
FIG. 23 is a perspective view of the container case and the photographic film separating device showing a relation of the position therebetween.

FIG. 23 shows a positional relation between the container case 61 and the photographic film separating device 30. The photographic film separating device 30 is disposed adjacent to the container case 61 in order to process the cartridge 1 and the photographic film F. The container case 61 is supported on a plurality of container supporting rollers 90 in a container case accommodating device 91.

Figure 24:
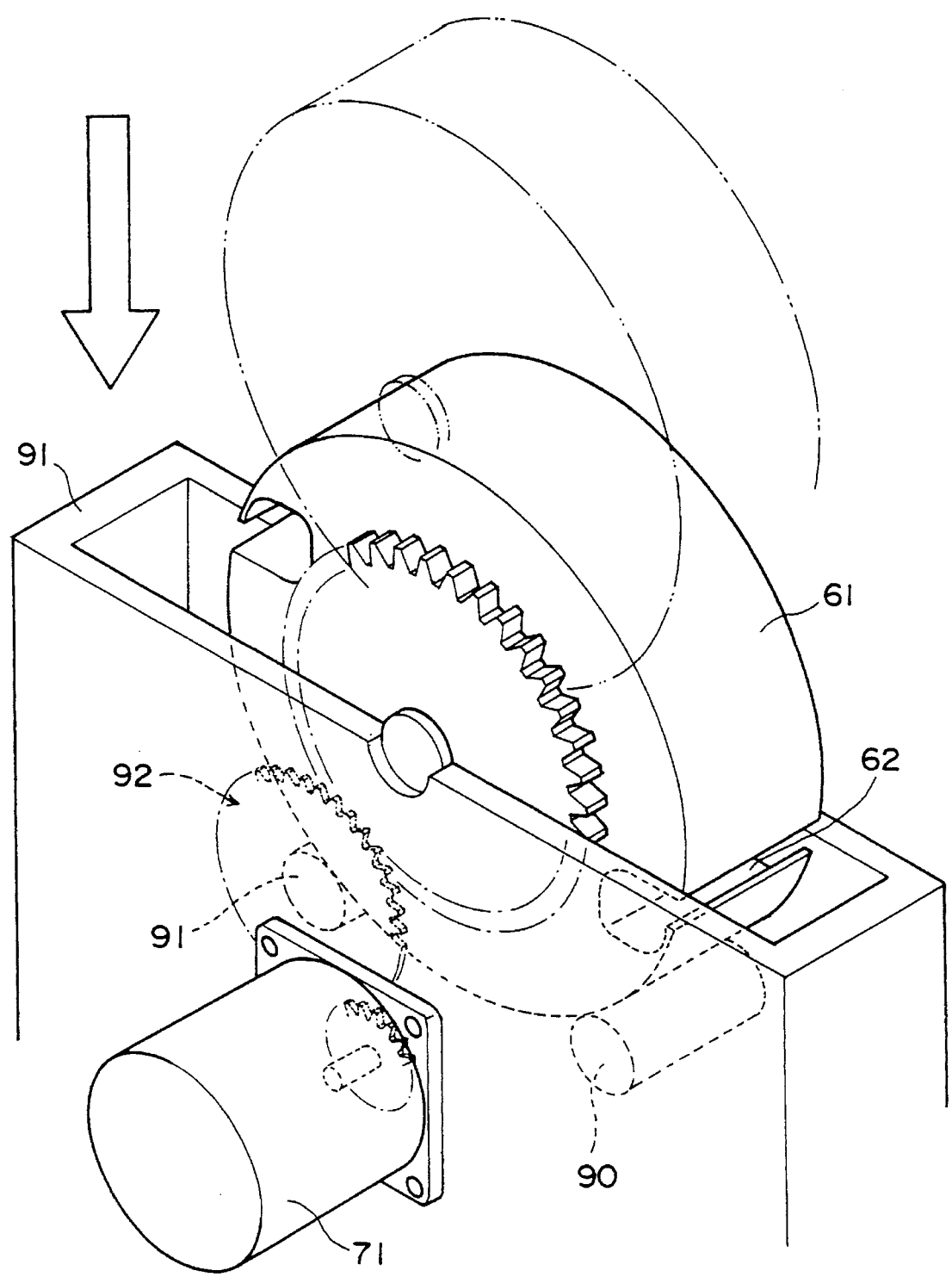
FIG. 24 is a perspective view of the container case and a container case accommodating device.

In FIG. 24, the container case 61 is removably disposed in the container case accommodating device 91. The container case 61 is rotated by a gear train 92 which is driven by the motor 71. A conventional accommodating device may be used as the container case accommodating device 91 of the present invention. In FIGS. 23 and 24, the container case 61 includes a plurality of cartridge accommodating portions 62 for accommodating cartridges 1.

What is claimed is:

1. A photographic film separation method comprising the steps of:

providing a cartridge which is formed by a cartridge main body provided such that an interior portion thereof can be maintained in a light-shielded state, and a spool which is provided at the interior portion of said cartridge main body such that said spool is freely rotatable around an axis of said spool, said spool having a slit which is formed along an axial direction of said spool, a first rod-shaped member provided, with respect to said slit, in a direction orthogonal to the axial direction of said spool, and a second rod-shaped member provided in a direction orthogonal to the axial direction of said spool at an opposite side of said slit with respect to said first rod-shaped member, said second rod-shaped member having a lower rigidity than said first rod-shaped member and being flexibly deformable, said first rod-shaped member having an engagement member which engages a longitudinal direction end portion of a photographic film at a surface of said first rod-shaped member opposing said slit, said second rod-shaped member having a presser pawl which protrudes from a surface of said second rod-shaped member opposing said slit and which maintains a state of engagement between the photographic film and said engagement member;

providing a container case for accommodating at least one said cartridge for the photographic film;

inserting a separating member between said engagement member and the photographic film positioned within said slit of said cartridge, said separating member having a tip end portion provided to positions at which said engagement member and said presser pawl are provided; and releasing engagement between the photographic film and said engagement member;

wherein said separating member is curved such that surfaces of said separating member in a direction of thickness thereof which contact the photographic film and said engagement member have a predetermined radius of curvature in a direction of insertion of said separating member, and said insertion is effected by pivoting said separating member around a center of the radius of curvature.

2. A photographic film separation method according to claim 1, wherein both longitudinal direction end portions of said second rod-shaped member are formed integrally with said spool, said presser pawl is formed at a longitudinal direction intermediate portion of said second rod-shaped member, and said insertion causes flexible deformation of said presser pawl.

3. A photographic film separation method according to claim 2, wherein the longitudinal direction intermediate portion of said second rod-shaped member is divided such that a predetermined gap is formed, and a first presser pawl and a second presser pawl are formed at end portions of said divided second rod-shaped member which oppose each other across said predetermined gap.

4. A photographic film separation method according to claim 1, wherein said presser pawl has a taper surface which is formed such that a distance between a surface of said second rod-shaped member opposing said slit and an outer periphery of said taper surface increases as a distance, in a direction of insertion of said separating member, from an opening portion of said slit through which said separating member is inserted increases, and said insertion is effected such that said separating member moves along said taper surface.

5. A photographic film separation method according to claim 1, wherein said engagement member comprises projections which have taper surfaces formed such that a distance between a surface of said first rod-shaped member opposing said slit and an outer periphery of each of said taper surfaces increases as a distance, in a direction of insertion of said separating member, from an opening portion of said slit through which said separating member is inserted increases, and said releasing is effected by inserting said separating member so that said separating member is moved along said taper surfaces and moves the photographic film so that the photographic film separates from said first rod-shaped member.

6. A photographic film separation method according to claim 1, wherein said cartridge is accommodated in said container case after separation of said photographic film from said cartridge.

7. A photographic film separation method according to claim 1, wherein said photographic film is separated from said cartridge which is accommodated in said container case.

8. A photographic film separation method according to claim 1, wherein said photographic film is separated from said cartridge which is removed from said container case.

9. A photographic film separation method according to claim 1, wherein said cartridge includes an ID number, and said container case includes an address number of a cartridge accommodating portion, and said ID number and said address number are collated with each other.

10. A device for separating a photographic film wound on a spool provided in a cartridge main body, comprising:

a container case for accommodating at least one cartridge for the photographic film;

a holder for holding the cartridge main body; and a separating member being inserted between a photographic film positioned inside a slit formed in a shaft portion of the spool and an engagement member which protrudes into the slit and engages a trailing end portion of the photographic film, so that engagement between the photographic film and said engagement member is released, wherein said separating member is inserted into a film passage formed in the cartridge main body from an exterior of the cartridge main body, and which causes flexible deformation of the shaft portion in a direction in which said shaft portion moves away from the slit, and further wherein said separating member has a rotating central shaft, and said rotating central shaft is connected to said separating member and transmits, from the exterior, a driving force for moving said separating member.

11. A device for separating a photographic film according to claim 10, wherein said holder has a base block, and said base block positions the cartridge main body in a predetermined position.

12. A device for separating a photographic film according to claim 11, wherein said holder has a pressing member, and said pressing member fixes the cartridge main body positioned by said base block by pressing the cartridge main body against said base block.

13. A device for separating a photographic film according to claim 11, wherein said separating member has arms, and said arms transmit the driving force from said rotating central shaft to said separating member.

14. A device for separating a photographic film according to claim 10, further comprising:

driving apparatus for applying a driving force to said separating member.

15. A device for separating a photographic film according to claim 11, wherein said separating member is an elongated plate-shaped member whose tip end portion is formed in a substantial circular arc shape as seen from a direction of thickness of said separating member.

16. A device for separating a photographic film according to claim 10, wherein said separating member is curved such that surfaces of said separating member in a direction of thickness thereof have a predetermined radius of curvature in a direction of insertion of said separating member.

17. A device for separating a photographic film according to claim 10, wherein said separating member is an elongated plate-shaped member whose tip end portion is formed such that corner portions of said tip end portion are substantially circular arc shaped as seen from a direction of thickness of said separating member.

18. A device for separating a photographic film according to claim 1, wherein said separating member is curved such that surfaces of said separating member in a direction of thickness thereof have a predetermined radius of curvature in a direction of insertion of said separating member.

19. A device for separating a photographic film according to claim 10, wherein said separating member is a metal plate.

20. A device for separating a photographic film according to claim 10, wherein said separating member has a higher rigidity than said shaft portion of said spool.

21. A device for separating a photographic film according to claim 10, wherein said container case is removably disposed to said device for separating the photographic film.

* * * * *